US008475002B2

(12) United States Patent
Maxik et al.

(10) Patent No.: US 8,475,002 B2
(45) Date of Patent: Jul. 2, 2013

(54) SUSTAINABLE OUTDOOR LIGHTING SYSTEM AND ASSOCIATED METHODS

(75) Inventors: Fredric S. Maxik, Indialantic, FL (US); David E. Bartine, Cocoa, FL (US); Robert R. Soler, Cocoa Beach, FL (US); Matthew Regan, Melbourne, FL (US); Addy S. Widjaja, Palm Bay, FL (US); Mark Andrew Oostdyk, Cape Canaveral, FL (US)

(73) Assignee: Lighting Science Group Corporation, Satellite Beach, FL (US)

( * ) Notice: Subject to any disclaimer, the term of this patent is extended or adjusted under 35 U.S.C. 154(b) by 0 days.

(21) Appl. No.: 13/465,921

(22) Filed: May 7, 2012

(65) Prior Publication Data
US 2012/0306382 A1 Dec. 6, 2012

Related U.S. Application Data

(63) Continuation-in-part of application No. 13/329,803, filed on Dec. 19, 2011, and a continuation-in-part of application No. 12/434,417, filed on May 1, 2009, now Pat. No. 8,308,318.

(51) Int. Cl.
*F21V 23/04* (2006.01)
*F21S 9/03* (2006.01)

(52) U.S. Cl.
USPC ........... 362/276; 362/231; 362/502; 362/157; 362/802

(58) Field of Classification Search
USPC .................. 362/276, 802, 249.02, 231, 431
See application file for complete search history.

(56) References Cited

U.S. PATENT DOCUMENTS

| | | | |
|---|---|---|---|
| 5,963,192 A | 10/1999 | Wong et al. |
| 6,149,283 A | 11/2000 | Conway et al. |
| 6,150,774 A | 11/2000 | Mueller et al. |
| 6,250,774 B1 | 6/2001 | Begemann et al. |
| 6,598,996 B1 | 7/2003 | Lodhie |
| 6,601,984 B2 | 8/2003 | Yamamoto et al. |
| 6,624,845 B2 | 9/2003 | Lloyd et al. |
| 6,676,279 B1 | 1/2004 | Hubbell et al. |
| 6,705,744 B2 | 3/2004 | Hubbell et al. |
| 6,774,916 B2 | 8/2004 | Pettitt et al. |
| 6,811,258 B1 | 11/2004 | Grant |
| 6,906,852 B1 | 6/2005 | Russell |

(Continued)

FOREIGN PATENT DOCUMENTS
DE 202005013164 11/2005
DE 102005059362 9/2006

(Continued)

OTHER PUBLICATIONS

U.S. Appl. No. 13/329,803, filed Dec. 19, 2011, Maxik et al.

(Continued)

*Primary Examiner* — Peggy A. Neils
(74) *Attorney, Agent, or Firm* — Mark R. Malek, Esq.; Daniel C. Pierron, Esq.; Zies Widerman & Malek

(57) ABSTRACT

A light fixture is described that measures the ambient light intensity and determines whether to provide illumination. The light fixture may further determine a traffic status proximate the fixture and adjust the illumination accordingly. A network of light fixtures is also provided, the light fixtures communicating data to each other and determining illumination states therefrom.

71 Claims, 23 Drawing Sheets

U.S. PATENT DOCUMENTS

| | | | |
|---|---|---|---|
| 7,014,336 B1 | 3/2006 | Ducharme et al. | |
| 7,093,956 B2 | 8/2006 | Miller et al. | |
| 7,095,056 B2 | 8/2006 | Vitta et al. | |
| 7,163,325 B2 * | 1/2007 | Kojima et al. | 362/540 |
| 7,731,383 B2 * | 6/2010 | Myer | 362/145 |
| 7,759,854 B2 | 7/2010 | Miller et al. | |
| 7,777,166 B2 | 8/2010 | Roberts | |
| 7,845,823 B2 | 12/2010 | Mueller et al. | |
| 7,850,321 B2 | 12/2010 | Wang et al. | |
| 7,850,335 B2 | 12/2010 | Hsu et al. | |
| 7,863,829 B2 * | 1/2011 | Sayers et al. | 315/291 |
| 7,909,479 B2 | 3/2011 | Rooymans | |
| 7,942,537 B2 | 5/2011 | Krijn et al. | |
| 7,959,320 B2 * | 6/2011 | Mueller et al. | 362/231 |
| 7,972,030 B2 | 7/2011 | Li | |
| 8,021,021 B2 | 9/2011 | Paolini | |
| 8,040,102 B2 * | 10/2011 | Kao et al. | 320/101 |
| 8,061,869 B2 | 11/2011 | Lo et al. | |
| 8,096,685 B2 | 1/2012 | Lu et al. | |
| 8,100,552 B2 | 1/2012 | Spero | |
| 8,118,456 B2 | 2/2012 | Reed et al. | |
| 8,130,099 B2 | 3/2012 | Steinel et al. | |
| 8,136,969 B2 | 3/2012 | Burkett et al. | |
| 8,143,811 B2 * | 3/2012 | Shloush et al. | 315/297 |
| 8,193,713 B2 * | 6/2012 | Jung et al. | 315/158 |
| 2005/0265023 A1 | 12/2005 | Scholl | |
| 2006/0056169 A1 | 3/2006 | Lodhie et al. | |
| 2006/0149607 A1 | 7/2006 | Sayers et al. | |
| 2007/0081339 A1 | 4/2007 | Chung et al. | |
| 2008/0043464 A1 | 2/2008 | Ashdown | |
| 2008/0055065 A1 | 3/2008 | Feldmeier | |
| 2008/0080178 A1 | 4/2008 | Kita et al. | |
| 2009/0284966 A1 * | 11/2009 | Crookham et al. | 362/231 |
| 2010/0277097 A1 | 11/2010 | Maxik et al. | |

FOREIGN PATENT DOCUMENTS

| | | |
|---|---|---|
| WO | WO 2005072279 | 8/2005 |
| WO | WO 2007069185 | 6/2007 |
| WO | WO 2008019481 | 2/2008 |

OTHER PUBLICATIONS

European Search Report for European Application No. 10161574.8 dated Sep. 8, 2010.

"LED Street Lights"; Apr. 1, 2007; Written by: Philip Proefrock; 18 pp.

LEDs Magazine—Streelighting; "On the verge: LEDs are ready to challenge incumbent light sources in the streetlighting market"; Oct. 2006; pp. 11-13, 16 & 17.

Swillas Engineering LTD; "Solar Street Lights"; 2005; 3 pp.

* cited by examiner

US 8,475,002 B2

SUSTAINABLE OUTDOOR LIGHTING SYSTEM AND ASSOCIATED METHODS

RELATED APPLICATIONS

This application is a continuation in part of U.S. patent application Ser. No. 13/329,803 entitled Sustainable Outdoor Lighting System filed on Dec. 19, 2011, the entire contents of which are incorporated herein by reference, which is in turn a continuation application of U.S. patent application Ser. No. 12/434,417 filed on May 1, 2009, the entire contents of which are also incorporated herein by reference.

FIELD OF THE INVENTION

The present invention relates to the fields of lighting and, more specifically, to generating light for roadway applications that enhances at least one visual property and that is energy efficient, and associated methods.

BACKGROUND OF THE INVENTION

Outdoor lights using incandescent light bulbs have commonly been used to illuminate streets, parking lots, sidewalks, parks, and other public areas. Over the years, conventional street lights have been modified to provide functions other than illumination. For example, U.S. Pat. No. 6,624,845 to Loyd et al. discloses an apparatus mounted within a street lamp to provide surveillance using a directional antenna. However, the majority of street lights and parking lot lights still use incandescent light bulbs which result in unwanted glare, light trespass, energy waste, and sky glow. An estimated thirty percent of light generated outdoors by the aforementioned outdoor lights goes into space, flooding the skies and creating electric haze that reduces stargazing.

Many types of light sources can typically work efficiently in a narrow range of operating conditions which are governed by the physical and chemical properties of the materials used in the light source. There are only a few types of known artificial light sources such as low pressure sodium (LPS) lamps, for example, which are both highly efficient and can generate large amounts of light. While most of these types of light sources only provide quasi monochromatic light they offer utility for a number of outdoor illumination applications. Monochromatic light from LPS lamps, for example, while not enabling color rendering, can provide high visual contrast under sufficiently high illumination levels. Unfortunately, such monochromatic light is visually unappealing, with people often preferring white light generated by broadband spectral sources. Broadband spectral illumination, however, can cause undesired light pollution and environmental concerns within regions that are proximate as well as remote from the artificial night lighting.

Outdoor light fixtures incorporating light sources including incandescent, fluorescent, high-intensity discharge (HID), or LPS lamps are usually equipped with optical systems comprising reflectors, refractors, and opaque shields that redirect light or suppress unwanted light propagation. Optical systems can enable a light fixture to effectively illuminate target surfaces while reducing undesired illumination of other areas. Many highly efficient light sources such as LPS and HID lamps, however, are bulkily shaped and require large optical systems.

In addition, light pollution can be a significant concern for astronomers and conservationists. The American Astronomical Society has noted that light pollution, and in particular urban sky glow caused by directly emitted and reflected light from roadway, residential and security lighting, for example, severely impacts the ability for terrestrial astronomy.

Walker's Law is an empirical equation based on sky glow measurements which were obtained from observations of a number of Californian cities. From Walker's Law, light pollution from a city is assumed to be related linearly to the population and the inverse 2.5 power of the distance. For example, Tucson (Ariz.) has a population of 500,000 people and is located approximately 60 km from Kitt Peak National Observatory. Tucson would therefore contribute approximately 18 percent to the total sky glow at this observatory.

It has been shown that light pollution can, moreover, have detrimental environmental effects on plants and animal species, for example nocturnal mammals, migratory birds and sea turtles. For example, roadway and security lighting along the coastline of Florida has been shown to result in sometimes catastrophic reductions in the breeding success of several species of sea turtles. For example, bright lights can inhibit adult female turtles from coming ashore to lay their eggs and also lure newly hatched turtles inland rather than to the open sea.

The American Astronomical Society and the International Astronomical Union recommend several solutions for alleviating light pollution. The recommendations include controlling the emitted light via light fixture design and placement, taking advantage of timers and occupancy sensors, using ultraviolet and infrared filters to remove non-visible radiation, and using monochromatic light sources such as low-pressure sodium lamps for roadway, parking lot, and security lighting.

LPS lighting is particularly useful near astronomical observatories because the emitted light is essentially monochromatic with an emission peak at 589 nm. Narrow band rejection filters can then be used to block this region of the spectrum while allowing astronomical observations at other wavelengths. Unfortunately, LPS lamps have a number of disadvantages when used in outdoor lights. First, the LPS lamps and their light fixture housings are typically large. For example, the LuxMaster™ luminaire product series from American Electric Lighting measures from 0.75 m to 1.35 m in length for 55 W to 180 W lamps. The large anisotropic dimensions of LPS lamps can make the required light fixture optical system bulky and the device may be cost-ineffective. Furthermore, LPS lamps have poor color rendering indices (CRI) and are inferior in this regard to light sources such as high-pressure sodium (HPS) and metal halide lamps, for example. Moreover, the unnatural illumination effects resulting from LPS lamps make LPS-based roadway lighting an often undesired solution. Consequently, LPS lamps are often limited to security and parking lot lighting for industrial sites. However, light sources with better color rendering are favored whenever color discrimination is more important than energy efficiency such as for certain safety or monitoring applications, for example.

As energy costs rise and the cost of producing LEDs fall, LED lighting systems have become an ever-increasing viable alternative to the more conventional systems, such as those employing incandescent, fluorescent, and/or metal-halide bulbs. One long-felt drawback of LEDs as a practical lighting means had been the difficulty of obtaining white light from an LED. Two mechanisms have been supplied to cope with this difficulty. First, multiple monochromatic LEDs were used in combinations (such as red, green, and blue) to generate light having an overall white appearance. More recently, a single LED (typically blue) has been coated with a phosphor that emits light when activated, or "fired" by the underlying LED (also known as phosphor-conversion (PC) LEDs). This innovation has been relatively successful in achieving white light with characteristics similar to more conventional lighting, and has widely replaced the use of monochromatic LED combinations in LED lighting applications. Monochromatic LED color combinations are more commonly used in video, display or signaling applications (light to look at), as opposed to being used to illuminate an area (light to see by). As even a relatively dim light can be seen, the luminous intensity generated by LEDs in video or display applications is not a major concern.

More recently, LEDs have started to be used in high-power devices, and are no longer limited to smaller uses such as in indicator lamps. Further, LEDs are generally more energy efficient than the lighting devices traditionally used in the general illumination market. As a result, LEDs are considered an attractive alternative to traditional general lighting devices, and are encroaching on a variety of applications in the general illumination market. Light emitted from multiple LEDs having varying chromaticity can be mixed to generate white light. Despite relatively narrow emission spectra of each LED, polychromatic color mixing devices that incorporate four or more primary sources may cover the entire visible spectrum and accurately render the colors of illuminated objects. For example, an optimized quadri-chromatic red-amber-green-blue (RAGB) device has been shown to feature high values of both the general and all the special color rendering indices. Further, and notwithstanding recent advances in the field of phosphor deposition on LEDs, these devices may operate more efficiently than the phosphor-conversion white LEDs since there is no energy loss due to conversion. Additionally, these devices allow for full color control, the ability to tradeoff between qualitative characteristics (e.g. efficiency) and quantitative characteristics (e.g. color rendering, depth perception, etc.), the incorporation of internal feedback for compensation of chromaticity variations due to aging, temperature, etc., and the like, and adjustments to emitted wavelengths due to ambient light conditions, manual activation, or an automated schedule.

As a result, a need exists for an improved system and method for generating light. In particular, a need exists for a system and method that supplement primary illumination that may comprise a yellow/amber wavelength range with secondary illumination that may comprise a red wavelength range or green wavelength range. In this manner, one or more properties of the generated light may be adjusted to increase both the energy efficiency and overall lifespan of the system components while providing for an enhancement of at least one visual property during a critical period via combination of the primary and secondary illumination.

As a light source of ever increasing choice, LEDs have been packaged in numerous forms and used in lighting applications. Special control circuits have been developed to take advantage of the variability offered by the new light source and are today being offered as a solution to specific applications. In general however the design process has not zeroed in on providing the correct lighting solution. A number of LED illumination devices create "white" light by combining two or more LEDs of various wavelengths. White LEDs are also made using phosphors. The goal has not been to vary this color spectrum in real time to coordinate with the usage of the living space. The term "white" light is loosely interpreted to cover a range of illuminating light acceptable to the user for that application. HPS's yellow light has even been called white by some and the term is exclusive only of almost monochromatic sources such as LEDs and LPS lamps. The terms light spectrum, spectra, spectrum, spectral and color are used to refer to the relative spectral power distribution of the light source.

In everyday use, as dusk approaches dim twilight and nighttime darkness adversely impact our visual perception. At dusk there is poor visual contrast for driving, and our ability to accurately judge distances lessens. Also, on rainy nights, reflections from vehicles and street lights may be especially distracting. A lighting system is required that may make adjustments to the wavelengths of its emitted light in order to compensate for deficiencies in the human eye due to the specific ambient conditions. Such selection or alteration of the lighting system's emitted wavelength may provide a wide variety of other benefits in addition to improving human night vision, depth perception, and visual acuity. One such benefit may be an outdoor lighting system capable of automatically adjusting its emitted wavelengths so as not to interfere with certain light-sensitive species of animals during theft respective nesting, reproduction, migration times, and the like.

A long felt need exists for a lighting system and method adapted for use in outdoor lighting situations such that the primary illumination generated by the system or method is highly energy efficient, emitted in the direction needed (reducing the amount of light lost to the sky while improving overall nighttime viewing), and augmentable with secondary illumination comprised of a distinct wavelength range, wherein such a combination of illumination sources during a critical period enhances at least one visual properties within at least a portion of the target area of the field of illumination.

In the field of street illumination, street lights have traditionally been turned on to providing lighting by a timing mechanism. Such a timing mechanism requires communication between each street light and a central timer. Moreover, if the timer is not configured to vary according to changing sunrise and sunset times, the street lights could be illuminated prematurely, thus providing light to an already adequately illuminated environment and wasting electricity, or the street lights could be illuminated late, resulting in a period of time where a street is insufficiently illuminated, increasing the risk of incident for those travelling along the poorly lit street. Therefore, there is a long felt need for a street lighting system that independently determines when additional illumination is needed for safe travel along a street, and for providing the illumination automatically.

Furthermore, the amount of illumination needed from sunset to sunrise varies widely according to a variety of factors, including human nighttime perception, other sources of environmental light, and others. Accordingly there is a long felt need for a street lighting system that adjusts the intensity of light provided to meet the demands of the environment around the system at a given time. Moreover, such adjustment results in a more efficient system, consuming only the necessary amount of electricity to provide adequate, and not excessive, illumination.

Current street light systems do not presently detect the presence or absence of traffic. Moreover, those systems do not gauge the level of traffic, nor do they acquire information on the speed or direction of travel of traffic. Therefore, all street lights in a system are configured to operate for a period of time, such as dusk to dawn, and then turn off. For those times when there is no traffic, vehicular, pedestrian, or otherwise, within the lighting range of an illuminated street light, and the street light continues to operate a full lighting capacity, the electricity expended in the illumination is wasted. Accordingly, there is a long felt need for a street lighting system that can detect the presence or absence of traffic and illuminate accordingly. Moreover, when there is heavy traffic, the amount of illumination needed from a street light decreases, due to the illumination provided by the vehicles themselves. Accordingly, there is a long felt need for a street lighting system that emits light proportionally to vehicular traffic proximate the street lighting system.

Moreover, current street lighting systems do not detect the distance between the street light and an object, such as a vehicle, proximate to the street light. Furthermore, as the vehicle either approaches or departs from the street light, the light best perceived by the person operating the vehicle changes, with scotopic light being best perceived when the vehicle is relatively distant, and photopic light being best perceived when the vehicle is relatively close, with mesopic light being best perceived in the transition between scotopic and photopic. Accordingly, there is a long felt need for a street light system that adjusts the wavelength of the emitted light to correspond to substantially scotopic, mesopic, or photopic light.

As described above, current street lighting systems are operated by a timer. Even if current street lighting systems were equipped to detect vehicular traffic, current methods for detecting vehicular traffic are limited in range. It is possible that by the time a street light system has detected the presence of vehicular traffic, the target vehicle has traversed a significant distance without adequate illumination. Accordingly, there is a long felt need for a network of street lighting systems that communicates data regarding the status of traffic proximate one street lighting system to other nearby street lighting systems, resulting in a network of street lighting systems that can intelligently predict the flow of traffic and illuminate accordingly to provide adequate illumination before traffic is detected.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

Another embodiment of the invention includes a light fixture comprising a light source, an ambient light sensor, and a microcontroller functionally coupled to the light source and the ambient light sensor. The embodiment of the invention further includes a housing disposed substantially about the light source, and a support having a first end attached to the housing and a second end attached to a surface. The ambient light sensor may be configured to measure an ambient light intensity and function with the microcontroller to determine if the ambient light intensity is approximately equal to or less than a threshold intensity. Furthermore, the light source may be configured to emit light having an intensity proportional to the ambient light intensity. The light source may include two or more clusters of light emitting elements, such as light emitting diodes.

Another embodiment of the invention may further include a traffic sensor that can determine a traffic status, such as traffic volume, traffic speed, traffic direction, and traffic distance. Yet another embodiment of the invention may include a communication device enabling communication between the light fixture and other light fixtures, as well as between the light fixture and a network of devices, such as a traffic network.

An embodiment of the invention includes a network of light fixtures including light sources, ambient light sensors, traffic sensors, and communication devices, wherein each of the light fixtures is configured to transmit data generated by its ambient light sensor and traffic sensor to other light fixtures. Furthermore, each light fixture may relay data received from another light fixture, thereby creating a mesh network. In a further embodiment, groups of light fixtures may be associated to form a node, with a plurality of nodes forming a nodal network. Each of the nodes may be controlled by a node controller that communicates with each light fixture of the node controlled by the node controller. Furthermore, each node controller may be in communication with each other node controller, thereby forming a mesh nodal network.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

An embodiment of the invention, as shown and described by the various figures and accompanying text, provides an outdoor lighting system and method optimized for sustainable use and for enhancing at least one visual property within a target area. The invention may include an energy efficient primary illumination comprised of a first wavelength range wherein a secondary illumination comprised of a distinct second wavelength range may be combined thereto during critical periods to provide for enhancement of visual properties within the target area. Additionally, use of acuity tuned monochromatic light sources may greatly enhance the effectiveness and minimizing the form factor of the power generation and/or storage requirements. In this manner, color rendering, depth perception, night vision, and the like may be improved via combining the second wavelength range with the first wavelength range during at least one critical period. Dithering or minimal wavelength shifts within either one light fixture or adjacent light fixtures may further assist in augmenting visual characteristics with the target area.

Another embodiment of the invention provides monochromatic primary illumination that may be combined or augmented with one or more monochromatic secondary illumination sources to enhance both the efficiency and effectiveness of a lighting system under a range of ambient light conditions. These advantageous combination or augmentations of the various color wavelength constituents are particularly well-suited for use in connection with LED lighting systems, wherein current control means may further be incorporated.

Figure 1:
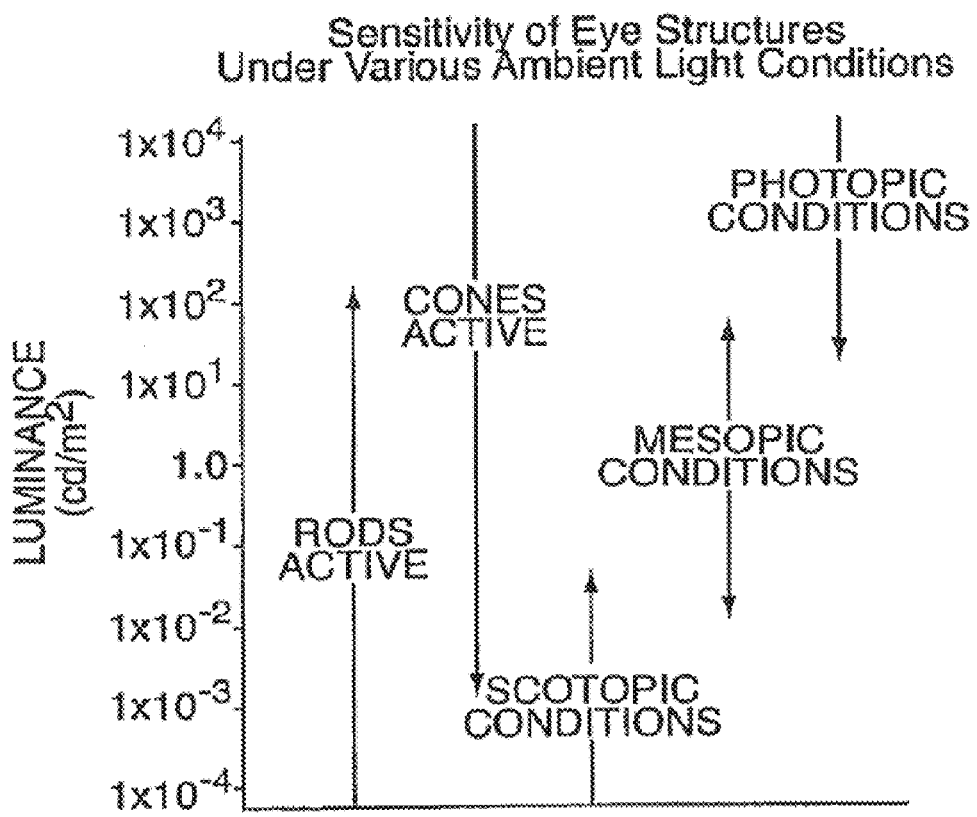
FIG. 1 illustrates the sensitivity of the human eye under various ambient light conditions.

The response of the human eye to various wavelengths of light differs depending on the ambient light conditions. This varying response is at least partially due to the two basic light-receptive structures in the eye, rods and cones. Cones tend to be more active in brightly-lit ambient conditions, whereas rods are more active in dimly-lit ambient conditions. FIG. 1 illustrates the response of the eye under a range of ambient lighting conditions. In relatively dark, or scotopic, ambient conditions, below approximately $1.0 \times 10^{-2}$ candellas/meter squared (cd/m), the rods predominate. In relatively bright, or photopic, ambient conditions, above approximately $1.0 \times 10^{1}$ $cd/m^2$ the cones predominate, Between scotopic and photopic conditions are mesopic conditions, in which optical response is largely due to the combined response of rods and cones.

Figure 2:
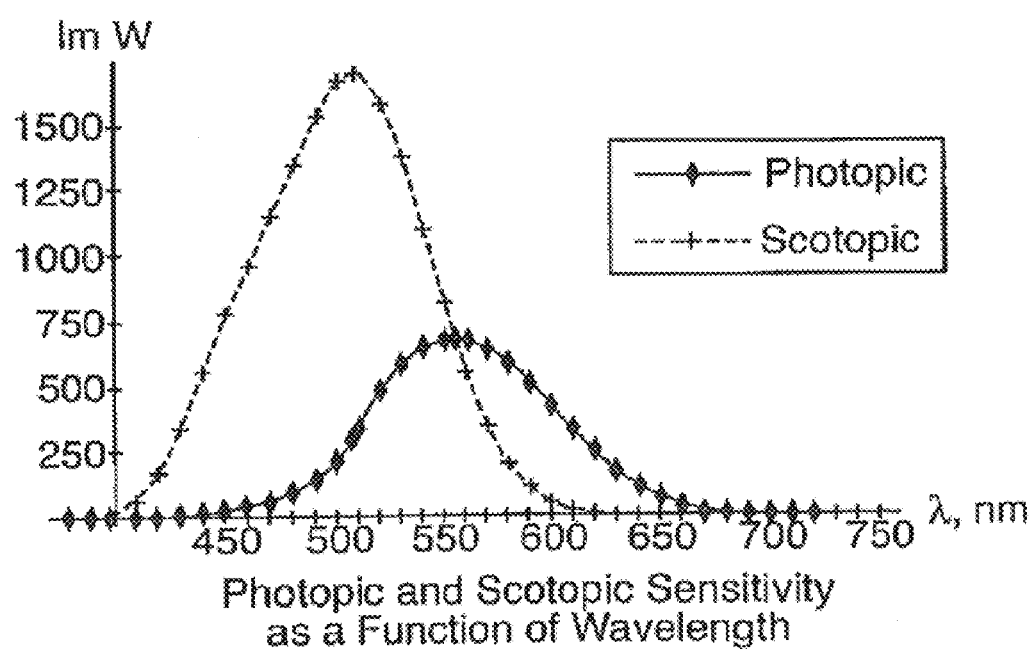
FIG. 2 illustrates the sensitivity of the human eye as a function of wavelength.

Cones are generally regarded as more sensitive to color differences whereas rods are more sensitive to the absence or presence of light. This is why animals with more acute night vision, such as cats, have eyes containing a relatively greater proportion of rods and are generally thought to be less capable of distinguishing colors. However, while the perception of color may be diminished in scotopic conditions, the rods are more sensitive to certain colors of light. The same is true of cones. As a result, the overall intensity of light perceived by the eye under both scotopic and photopic conditions is not simply a result of the intensity of the source, but also a function of the wavelength of the light produced by the source. As seen in FIG. 2, in scotopic conditions, the eye is most sensitive to light with wavelengths between approximately 450 nm to approximately 550 nm, with peak sensitivity at approximately 505 nm. In photopic conditions, the eye is most sensitive to light with wavelengths between approximately 525 nm to approximately 625 nm, with peak sensitivity at approximately 555 nm.

When the luminous intensities of variously colored LEDs is determined, this relationship is obscured, particularly with regards to scotopic effectiveness, because luminance has an inherently subjective component, as a luminance measurement is based on the photopic response of the human eye. The subjectivity of this measurement helps explain why lamps with relatively high lumen ratings, such as various sodium lamps (low-pressure sodium lamps and high-pressure sodium lamps) appear dim and harsh at night even though they possess a high lumen rating. A sodium lamp typically generates a very yellow light with a wavelength of approximately 600 nm. In dim mesopic or scotopic ambient conditions, the rods are more active, thus rendering the eye, in those conditions, less sensitive to the light being produced by the sodium lamp. Since typical nighttime outdoor lighting (pathway lighting, parking lot lighting, area lighting, and the like) are generally only designed for an intensity of approximately 0.5 cd or less, energy in such systems is largely wasted when used to produce light whose intensity will go largely unperceived by the eye due to an overly-high wavelength. Similarly, under photopic conditions, energy is less efficiently used to drive colors having relatively low wavelengths in a multi-color constituent lamp.

Preferably, one or more light emitting elements generating the primary illumination produce light having a first wavelength range at an energy efficient level for sustained light generation and one or more light emitting elements generating the secondary illumination produce light having a second wavelength range substantially corresponding to the peak scotopic sensitivity of the human eye or any other wavelength that may enhance at least visual property within the illumination target area.

Figure 3:
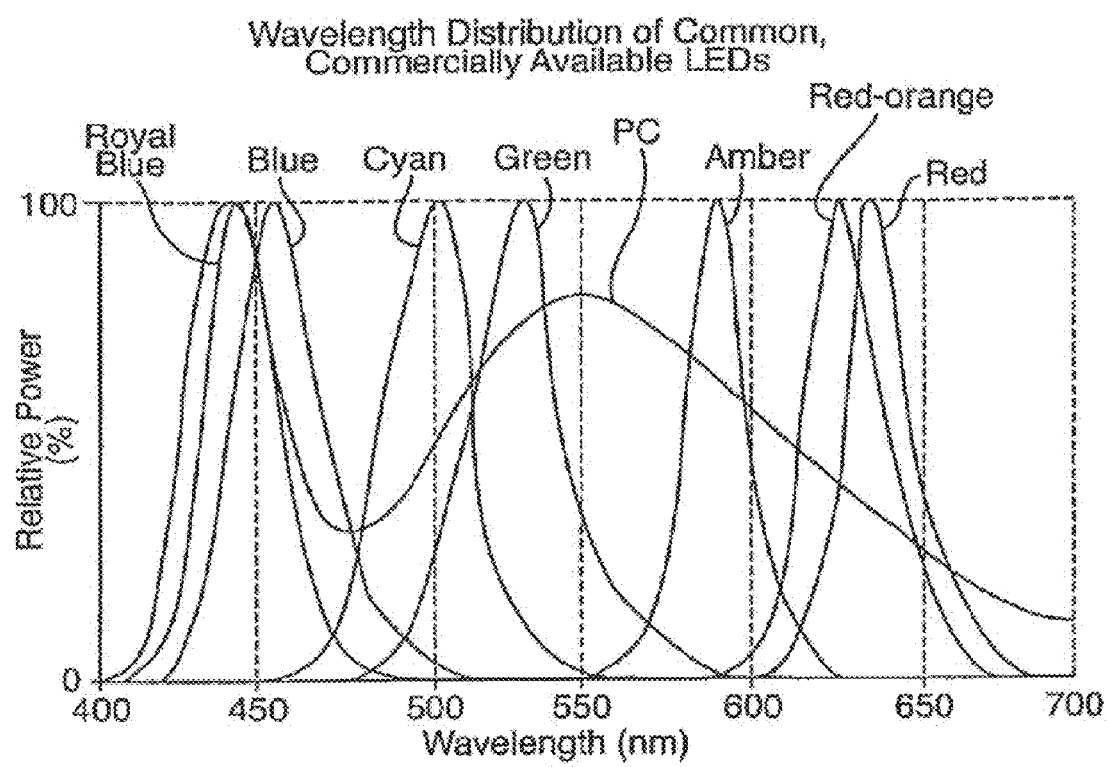
FIG. 3 illustrates the spectrums of common, commercially available LEDs.

Although monochromatic LEDs produce light only within a relatively narrow range of wavelengths (relative to incandescent lights or the sun, for instance), no existing LEDs produce only one discrete wavelength. In terms of currently-available LED colors (see FIG. 3, showing the wavelength characteristics of commonly-available LEDs), a cyan (or blue-green) LED generates light whose spectrum most closely coincides with the scotopic peak of approximately 505 nm. There is a gap in color coverage of monochromatic LEDs around the approximately 555 nm photopic peak. Green LEDs are currently, of the monochromatic LEDs, closest to the photopic peak, however the relatively broad spectrum produced by PC LEDs include wavelengths corresponding much more closely to the photopic peak. Monochromatic LEDs are the preferred choice since they require significantly less power to operate than a PC LED.

Figure 4:
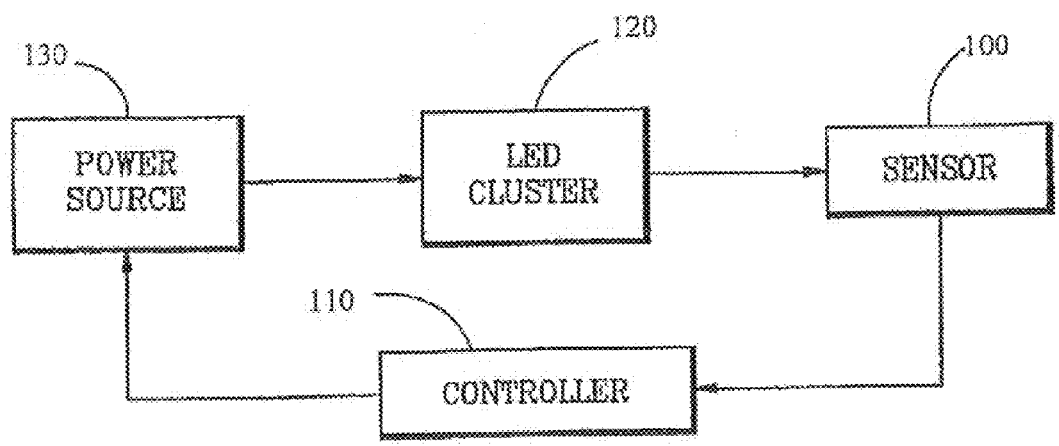
FIG. 4 illustrates a block diagram of a feedback control for maintaining the light output of an LED cluster.
Figure 10:
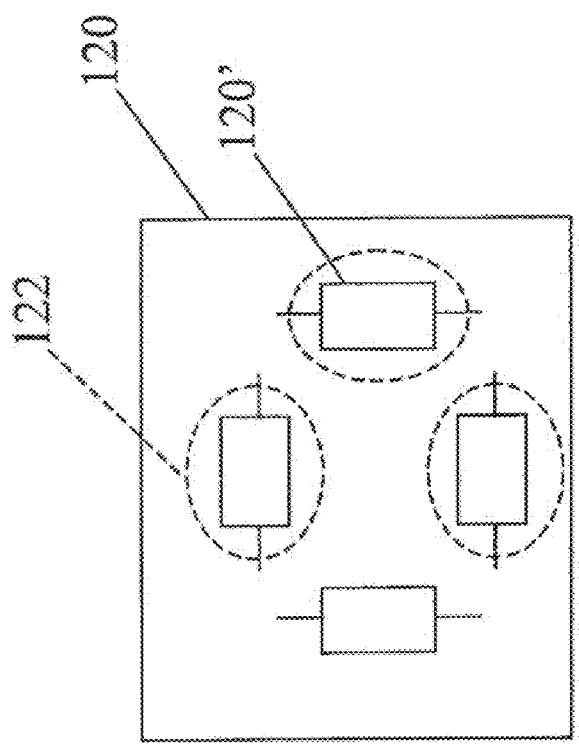
FIGS. 9 and 10 depict a block diagram schematic of LED arrangements for use as the LED cluster depicted in FIG. 4.
Figure 9:
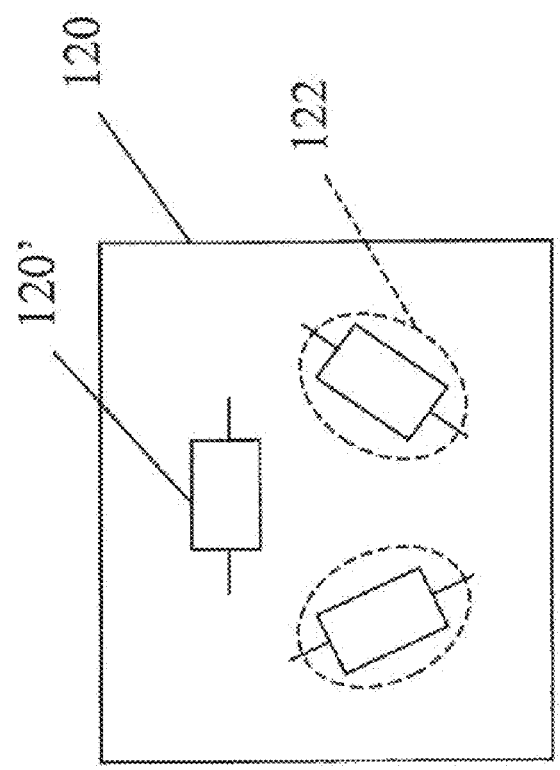

As illustrated in FIG. 4, the present invention may further comprise an ambient light sensor 100 that functions as an ambient light detection means. A programmable controller 110 may receive ambient light condition information as an input and, in scotopic (dark or night-time) conditions may perform a light adjustment routine to energize or adjust the relative intensities of the light emitting elements (e.g. LEDs 120) such that the overall spectrum of light produced by the lighting system will achieve a better scotopic response in the human eye. In an embodiment, the light emitting elements 120 include a plurality of LEDs 120', such as three or four LEDs 120' for example as illustrated in FIGS. 9 and 10, with one or more of the LEDs 120' being PC LED's having phosphor 122 disposed over the one or more LEDs 120'. In an embodiment, the phosphor 122 is provided in a hemispherical shell that encapsulates a film of high-efficiency, index-matched, semitransparent, fluorescent dye phosphor, separated from an underlying blue LED by an air gap. The adjustment may be consistently, continuously or programmably made in response to the ambient light condition, or made in response to the ambient light condition when the battery charge detector (a charge detection means, such as a voltmeter, amp-hour meter, specific gravity probe, or the like) indicates that the battery state of charge has dropped below a pre-determined threshold, or made in response to other sensing means discussed below. The system may further be in communication with a power source 130. The power source 130 may include any means known within the art including but not limited to electrical lines to a power supply company, an independent battery source, photovoltaic power sources, wind power sources, and the like. In an embodiment, sensor 100 may be an ambient light sensor as discussed above, or may be a motion sensor, an occupancy sensor, a manually activated switch, or a programmable logic controller that can be automatically activated at a preselected time interval or at preselected time intervals.

Figure 5:
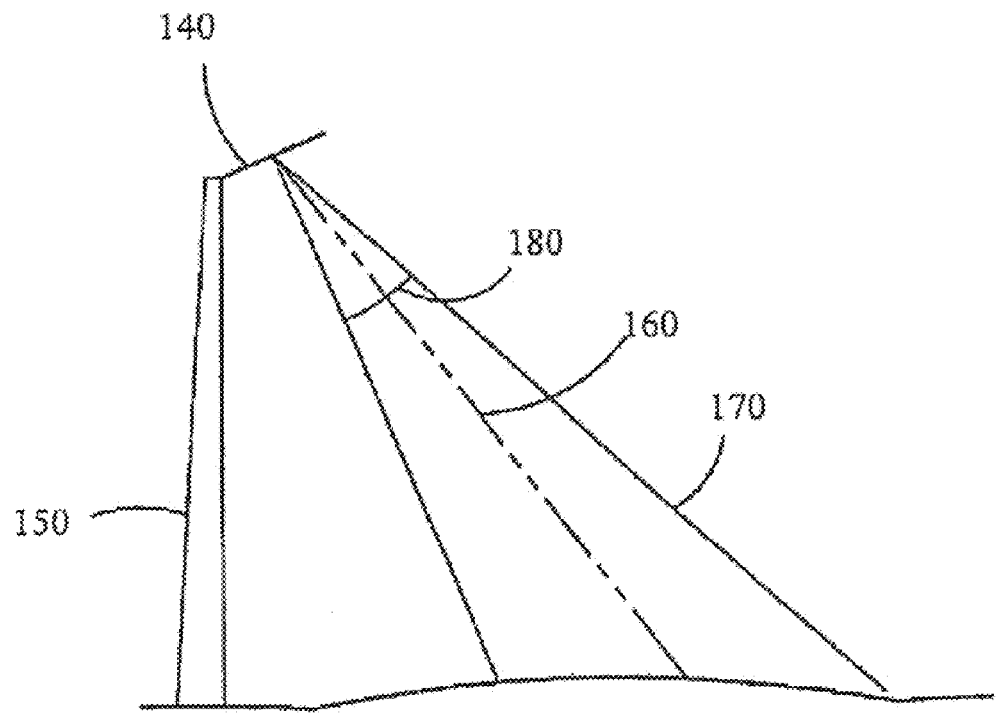
FIG. 5 depicts a side view of a target area illuminated by an embodiment of a pole mounted light source.
Figure 7:
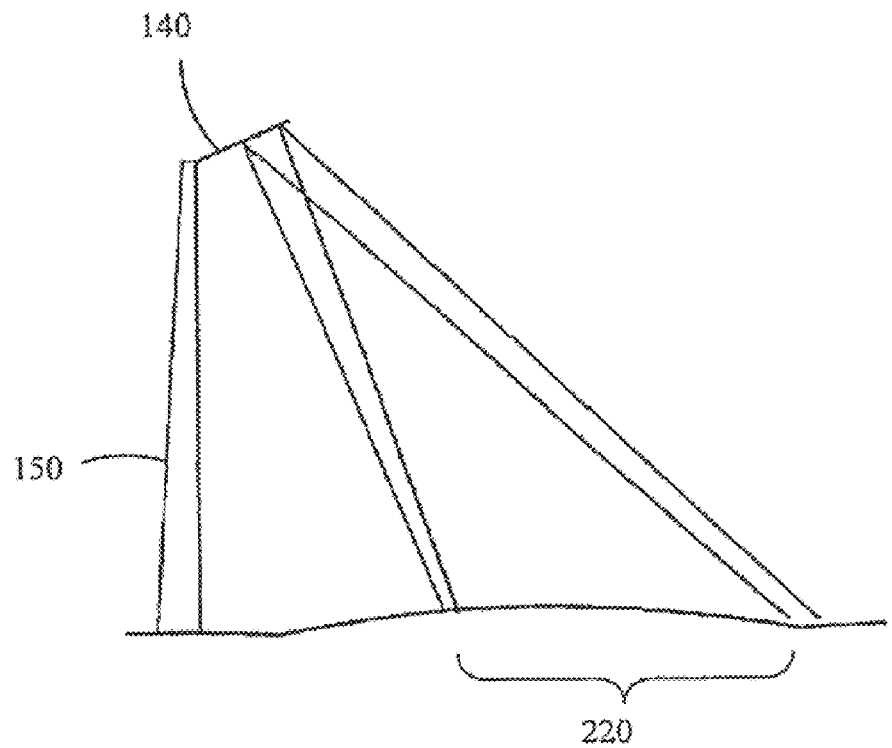
FIG. 7 depicts a side view of a target area illuminated by an embodiment of a pole mounted lighting system of the present invention.
Figure 8:
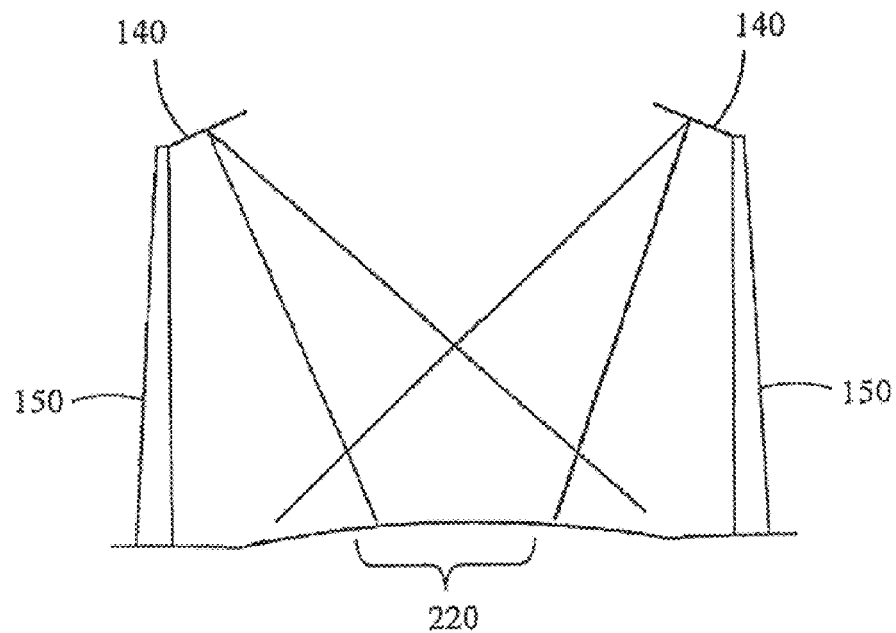
FIG. 8 depicts a side view of a target area illuminated by an embodiment of a pole mounted lighting system of the present invention.

A lighting system, more specifically, an outdoor lighting system may comprise one or more light fixtures 140 which may optionally be disposed atop a support structure 150 such as a pole, affixed to a building, wall, or fence, or disposed in other means known within the art. For the sake of clarity in the examples illustrated in FIGS. 5, 7, and 8, one or more light fixtures 140 are depicted as being disposed atop a support structure 150 (light pole). FIG. 5 depicts a typical street light that may be used in roadways, parking lots, parks, and the like. The light fixture 140 may emit light in an aiming direction which forms the axis 160 of a cone 170 with an angle 180, called a primary angle. FIG. 8 depicts the one or more light fixtures 140 as two light fixtures 140 a and 140 b having respective support structures 150 a and 150 b.

As an example of one use, present roadway lighting design codes may require that the roadway travel surface be at specific minimum illumination intensities, depending on the type of highway in question, i.e. interstate highway, secondary roadway, etc. The roadway lighting design code may also require that certain nearby surfaces other than the traveling roadway surface be illuminated with specific illumination intensities, again depending on the highway in question. Some of the nearby non-traveling surfaces usually required to be illuminated are the roadway shoulders and berm areas, and frequently the drainage ditch areas. A lighting design engineer may also desire to illuminate areas such as highway interchange in-fields for enhanced driving safety and other safety reasons. The design engineer may, therefore, be required to provide radiation and/or light patterns with significant intensity shifts from one specific area to another.

The one or more light fixtures 140 of the present invention may provide better visibility, require less power, utilize a longer lived light source, mount on standard lamp posts, reduce light pollution and emit light of various colors depending upon the selected LED, such as amber, yellow, red, green, and blue to improve at least one visual property within a target area during a critical period. In an embodiment, the critical period is defined by an event such as: activation of a motion sensor, activation of an occupancy sensor, attaining a specified ambient light threshold level, manual activation, and automated activation at a preselected time interval.

Figure 6:
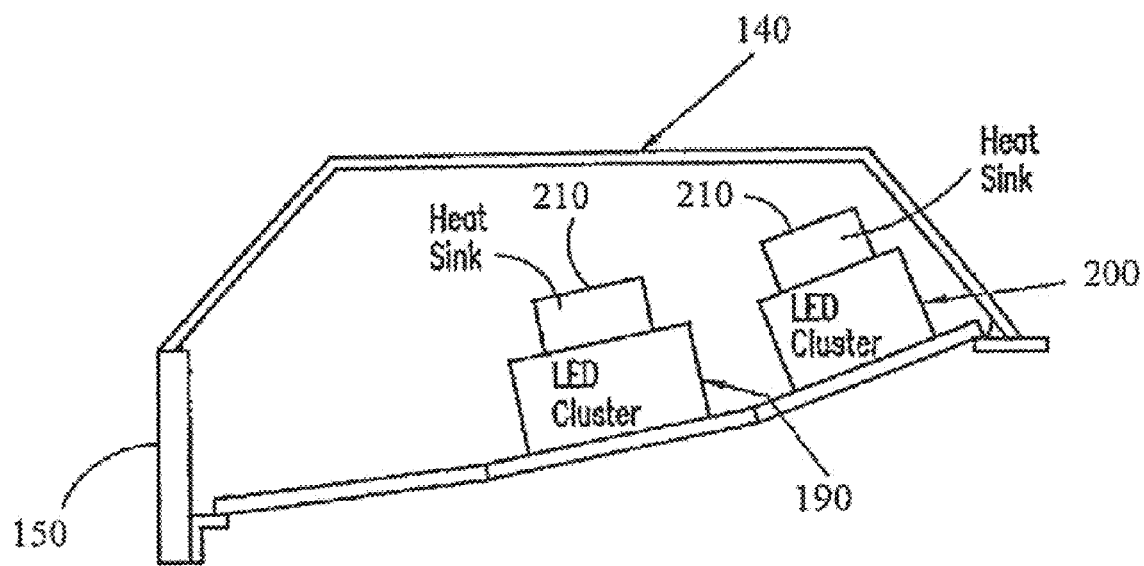
FIG. 6 depicts a cross-section view of an outdoor light fixture comprising one embodiment of the lighting system of the present invention.

As depicted in FIG. 6, the light fixture 140 may be newly manufactured or may be a pre-existing fixture having one more first light emitting elements 190 and one or more second light emitting elements 200 retrofit within the light fixture 140. The light fixture 140 is shown attached to a support structure 150. A first light source providing primary illumination may comprise one or more first light emitting elements 190. In an embodiment of the present invention the one or more first light emitting elements 190 are a cluster of light emitting elements such as light emitting diodes (LEDs) 120 disposed within the light fixture 140. A second light source providing secondary illumination may comprise one or more second light emitting elements 200. In an embodiment of the present invention the one or more second light emitting elements 200 are a cluster of light emitting elements such as light emitting diodes (LEDs) 120 disposed within the light fixture 140. In an embodiment, the one or more first light emitting elements 190 are disposed within first light fixture 140 a (see FIG. 8), and the one or more second light emitting elements 200 are disposed with second light fixture 140 b. In an embodiment, each cluster of LEDs 120 includes one or more phosphor-conversion LEDs, one or more monochromatic LEDs, or a combination of one or more phosphor-conversion LEDs and one or more monochromatic LEDs. In an embodiment, first light emitting elements 190 and second light emitting elements 200 may be controlled by the same controller 110 or by separate dedicated controllers 110. Each light source 190, 200 may be aimed at the same direction or at different directions toward a target area to deliver the desired lighting intensity and visual properties at the target surface area. Each light source 190, 200 may include a heat dissipating element 210 such as a heat sink which may be attached using heat transmissive material or any other means known within the art. The number of individual light emitting elements 190, 200 may be determined by the amount of light available from each cluster, the height of the light fixture 140, the area of the target to be illuminated, the amount of light desired on the target area, the contour of the target area and several other factors.

The selection of the wavelength range colors according to the present invention takes into account that the human eye has its greatest sensitivity in the visual spectrum at approximately 555 nm is photopic conditions and approximately 505 nm in scotopic conditions. As representatively shown in FIG. 2, high transmission in the yellow/amber wavelength range may begin at approximately 550 nm and extend to approximately 610 nm. Visual acuity may be heightened by the addition of light within the green wavelength range. The green wavelength range may extend from approximately 500 nm to 550 nm, with an optimal peak of approximately 525 nm. Night vision may be heightened by the addition of light within the red wavelength range. The red wavelength range may extend from approximately 610 nm to 660 nm, with an optimal peak of approximately 640 nm.

As shown in FIG. 6, the light generation system of the present invention may comprise one or more first light emitting elements 190 and one or more second light emitting elements 200 disposed within a light fixture 140. Each of the light emitting elements 190, 200 may comprise one or more phosphor-conversion LEDs, one or more monochromatic LEDs, an incandescent light bulb, a gas discharge tube, or a fluorescent tube, and preferably comprise one or more LEDs. In operation, the primary illumination generated by the one or more first light emitting elements 190 is combined with the secondary illumination generated by the one or more second light emitting elements 200 to produce light that improves at least one visual property within a target area during at least a critical period.

Various aspects of the invention will be further discussed with reference to an illustrative embodiment in which the one or more first light emitting elements 190 comprises monochromatic light emitting diodes generating light within the same range, a first wavelength range. In an embodiment, the first wavelength range comprises the yellow/amber wavelength range (a range that extends from 560 nm to 610 nm, for example). In typical use, only the one or more first light emitting elements 190 need be energized to generate sufficient light for a target area. However, during a critical time, such as when a vehicle approaches a roadway intersection, one or more second light emitting elements 200 may be energized to generate light within a second wavelength range. The second wavelength range may be that of any spectral color, however, in an embodiment the second wavelength range may comprise the green or red spectral color ranges (a range that extends from 500 nm to 550 nm, or from 610 nm to 660 nm, for example). It is understood, however, that this configuration is only illustrative, and various alternative lighting configurations may be used. In operation, the one or more first light emitting elements 190 alone are a vast majority of the time to provide for energy efficient lighting of a target area. During a critical period, the one or more second light emitting elements 200 are energized and the light of the second wavelength range combines with the light of the first wavelength range. Such combination allows the light of the second wavelength range to enhance at least one visual property for a human eye within at least a portion of the target area. In an embodiment, the at least one visual property includes color temperature, color rendering, depth perception, and night vision.

In this manner, visual acuity, night vision, color rendering, color temperature, depth perception, and the like may be enhanced within at least a portion of the target area during a critical period.

Figure 11:
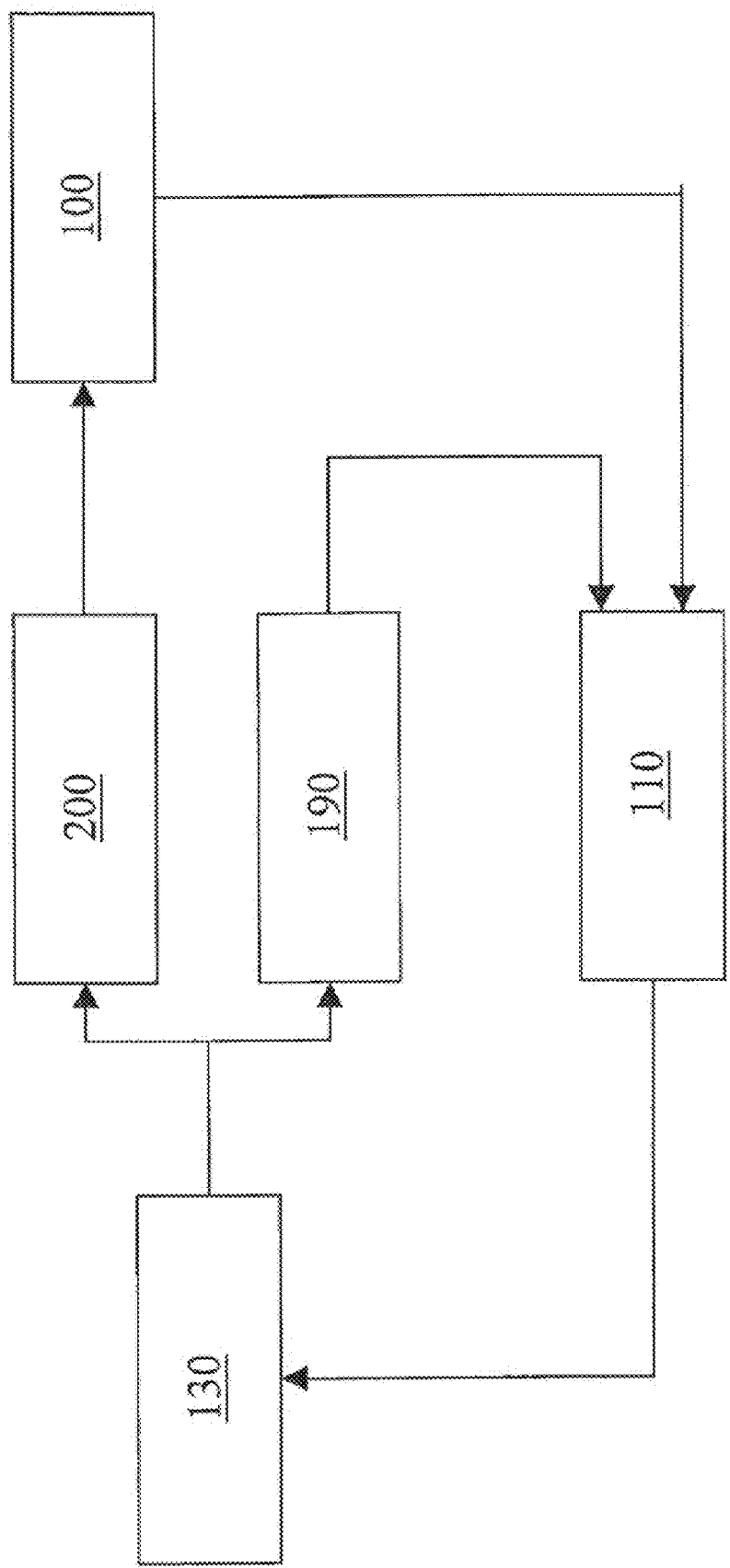
FIG. 11 depicts an alternate block diagram control scheme to that of FIG. 4.

Reference is now made to FIG. 11, which depicts a similar control scheme as that depicted in FIG. 4, but with two LED clusters 190, 200 (depicted in FIG. 4 as a single cluster 120), with each cluster 190, 200 comprising LED clusters 120 as depicted in FIGS. 9 and 10 for example. Here, the first LED cluster 190 provides primary illumination absent control via the sensor 100, and the secondary cluster 200 provides secondary illumination with control via the sensor 100, thereby enabling primary and secondary illumination control schemes as disclosed herein. For example, during a non-critical time period, controller 110 sends a signal to power source 130 to provide power to only first LED cluster 190 and during a critical time period, sensor 100 signals controller 110 to send a signal to power source 130 to provide power to both first and second LED clusters 190, 200. While the foregoing control scheme in relation to the illustration of FIG. 11 describes a specific arrangement, it will be appreciated by one skilled in the art that other control schemes may be equivalent in function and performance and are therefore considered within the scope of the invention disclosed herein.

It is an aspect of the present invention to provide an area lighting system and method that may retro-fit existing poles and the like without exceeding the existing lamp projected surface area thereby staying within the design wind load of the existing poles.

It is another aspect of the present invention to provide an area lighting system and method providing a light output that minimizes the occurrence of light pollution, generation of confusing driving conditions due to confusing night time lighting patterns, light trespass, glare, energy waste, high maintenance cost and contribution to urban sky glow.

It is another aspect of the present invention to provide an area lighting system that may act as an efficient, low maintenance and substantial power saving substitute for now widely used incandescent light bulbs for illumination of streets, parking lots and other public areas, requiring minimal wiring modification to the conventional streetlight or parking lot housings.

It is another aspect of the present invention to provide an area lighting system that emanates a highly energy efficient first wavelength range of light which may be supplemented with a second wavelength range of light to improve at least one visual property while at the same time reducing overall light pollution. In an embodiment, the wavelength ranges comprise yellow/amber, red, and green, but wavelength ranges including orange, cool white, and blue colors may also be used and herein are contemplated.

It is another aspect of the invention to provide an area lighting system and method for generating white light. In particular, primary illumination comprising a first wavelength range may be supplemented with secondary illumination of a second wavelength range during a critical period. The first wavelength range may comprise the yellow/amber wavelength range thereby providing highly energy efficient primary illumination similar to the conventional LPS or HPS lighting. The second wavelength range may comprise the red or green wavelength ranges. During a critical period, the secondary illumination may be energized and combined with the primary illumination resulting in an improvement in at least one visual property, such as color temperature, color rendering, depth perception and the like. By adjusting the wavelength range of the secondary illumination, specific desired visual attributes may be enhanced during required periods while primary illumination of a monochromatic nature may provide energy efficient lighting outside of any critical period. As a result, the invention provides a system and method of energy efficient illumination that can be incorporated into various lighting applications, and has an extended life when one or more light emitting diodes are used to generate the first and second wavelengths, respectively.

Figure 12:
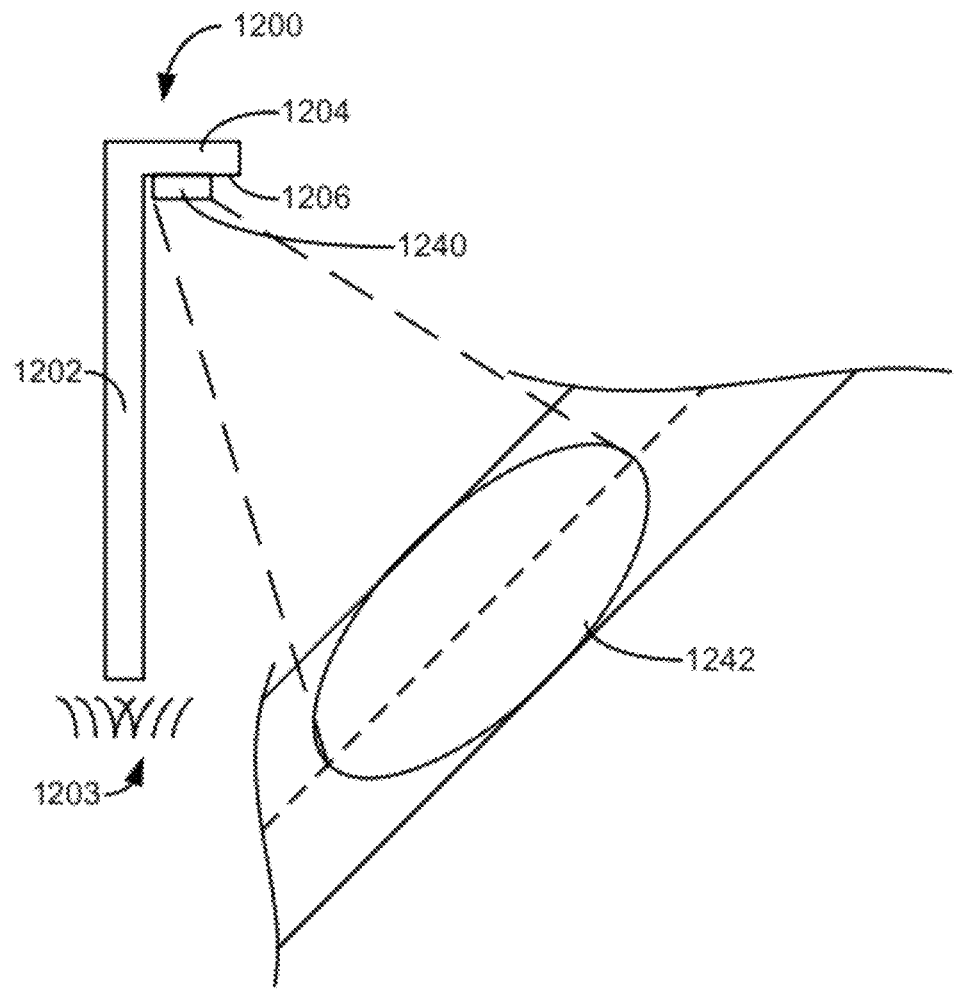
FIG. 12 depicts a perspective view of a light fixture of an embodiment of the invention installed alongside a thoroughfare.

An alternative embodiment of the invention, presented in the description and referenced figures hereinbelow, presents a light fixture and a method of operating a light fixtures, or a network of light fixtures. The invention may include a light fixture 1200 as depicted in FIG. 12. The light fixture 1200 may include a support structure 1202 attached at one end to a surface 1203, such as the ground or another structural surface. The light fixture 1200 may further include a housing 1204 within which certain elements of the light fixture may be at least partially within the housing 1204, described in greater detail hereinbelow. The housing 1204 may be connected to an end of the support structure 1202 opposite the end attached to the surface 1203. As further illustrated in FIG. 12, the light fixture 1200 is adapted to emit light downwardly onto a surface. In the illustrated embodiment, light is being emitted from the light fixture 1200 onto a roadway, but those skilled in the art will appreciate that light can be readily emitted onto any surface, and the depiction of a roadway is not intended to limit the intended use of the light fixture 1200, according to an embodiment of the present invention, to illumination of roadways.

Figure 13:
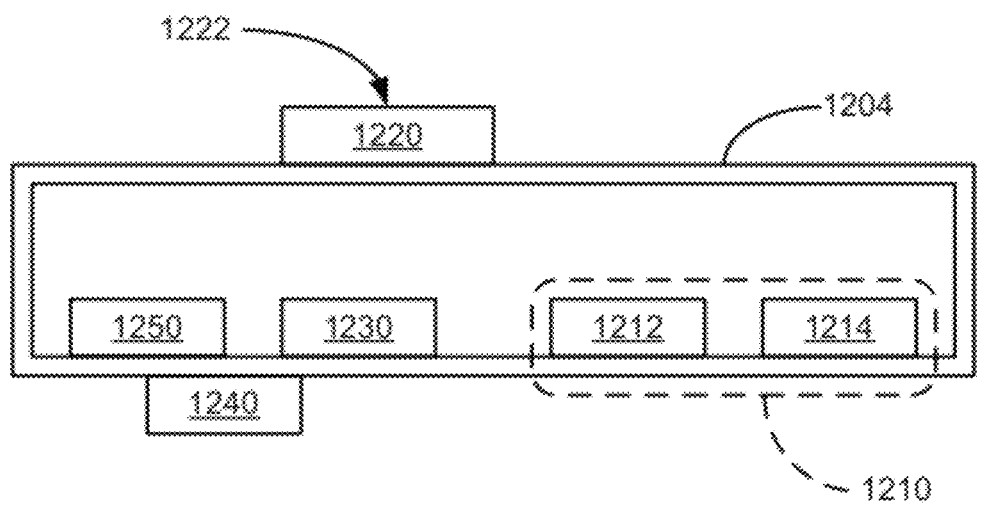
FIG. 13 depicts a sectional view of the light fixture of the embodiment of the invention depicted in FIG. 12.

Referring now additionally to FIG. 13, the light fixture 1200 may further include a light source 1210 that, when energized, emits light. The light source 1210 may include any device that is capable of emitting light having a wavelength range that corresponds to a substantially scotopic wavelength, a substantially photopic wavelength, or both. The light source 1210 of the present invention may include a first cluster of light emitting elements 1212 and a second cluster of light emitting elements 1214. Each of the first and second clusters of light emitting elements 1212, 1214 may be configured to emit light with substantially scotopic or photopic wavelengths, or both. Each cluster of light emitting elements 1212, 1214 may include one or more light sources, and the light sources may, for example, be selected from the group including LEDs, an incandescent light bulb, a gas discharge tube, a fluorescent tube, or any other type of light emitting device as understood by those skilled in the art. In an embodiment of the invention, the first cluster of light emitting elements 1212 may include a bank of LEDs having a color temperature of about 12000K, and the second cluster of light emitting elements 1214 may include three banks of LEDs having a color temperature of about 4000K.

Each of the clusters of light emitting elements 1212, 1214 may be configured to emit light within a particular wavelength range. For example, the first duster of light emitting elements 1212 may be configured to emit light having a wavelength range corresponding to a substantially scotopic wavelength range, such as, for example, between about 560 nm and about 610 nm. Furthermore, the second cluster of light emitting elements 1214 may be configured to emit light having a wavelength range corresponding to a substantially photopic wavelength range, such as, for example, between about 500 nm and about 550 nm or between about 610 nm and about 660 nm. The ranges provided above are meant to be exemplary in nature, and not intended to be limiting in any way. The skilled artisan will readily appreciate that the first and second bank of LEDs 1212, 1214 may emit lighting having any wavelength range while still accomplishing the goals, features and objectives according to the various embodiments of the present invention presented herein.

Referring now back to FIG. 12, the housing 1204 may include a lighting surface 1206. The lighting surface 1206 faces generally downwards and may be configured to permit the attachment of the light source 1210. For example, the lighting surface 1206 may include a plurality of passageways through the lighting surface 1206 through which a fastener may be disposed, thereby fixedly attaching the light source 1210 to the lighting surface 1206. Accordingly, the light source 1210 also may be directed generally downward, dependent upon emission and refraction characteristics of the light source 1210.

Returning now back to FIG. 13, the light fixture 1200 may further include an ambient light sensor 1220 that may function as an ambient light detector. The ambient light sensor 1220 may be a device that generates or modifies a signal to indicate the intensity of the ambient light of the environment around the light fixture 1200. Examples of devices that may comprise the ambient light sensor 1220 may include, without limitation, photovoltaic cells, photoresistors, photodiodes, charge-coupled devices (CODs), photomultiplier tubes, phototubes, and phototransistors. The ambient light sensor 1220 may be attached to an outside surface of the housing 1204 and may further include an operative surface 1222 upon which ambient light is incident. The operative surface 1222 may be oriented in any direction such that ambient light is incident upon it, for example, generally upwards.

The light fixture 1200 may further comprise a microcontroller 1230. The microcontroller 1230 may be functionally coupled to the light source 1210 and the ambient light sensor 1220 so as to control the operation of each. More specifically, the signal generated or modified by the ambient light sensor 1220 may be transmitted to the microcontroller 1230.

In some embodiments of the invention the ambient light sensor 1220 may include photovoltaic cells, such as, for example, a solar panel. As will be discussed in greater detail below, and as perhaps best illustrated in FIGS. 17-23, the solar panel may include an array of photovoltaic cells 1223 and accompanying circuitry to generate electricity from solar radiation.

Figure 17:
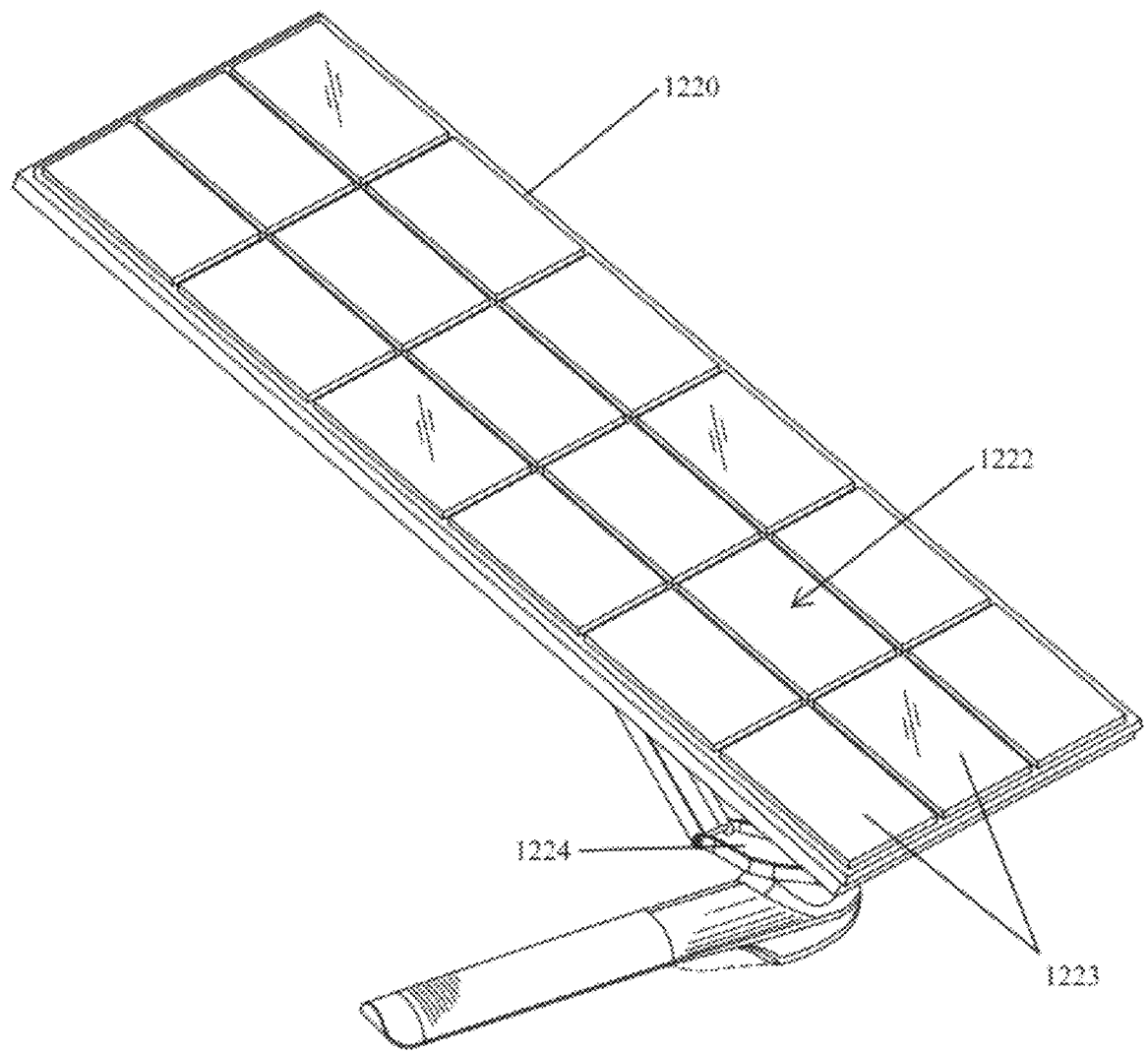
FIG. 17 depicts a perspective view of the attachment of a solar panel embodiment of the ambient light sensor to the light fixture according to an embodiment of the invention.
Figure 18:
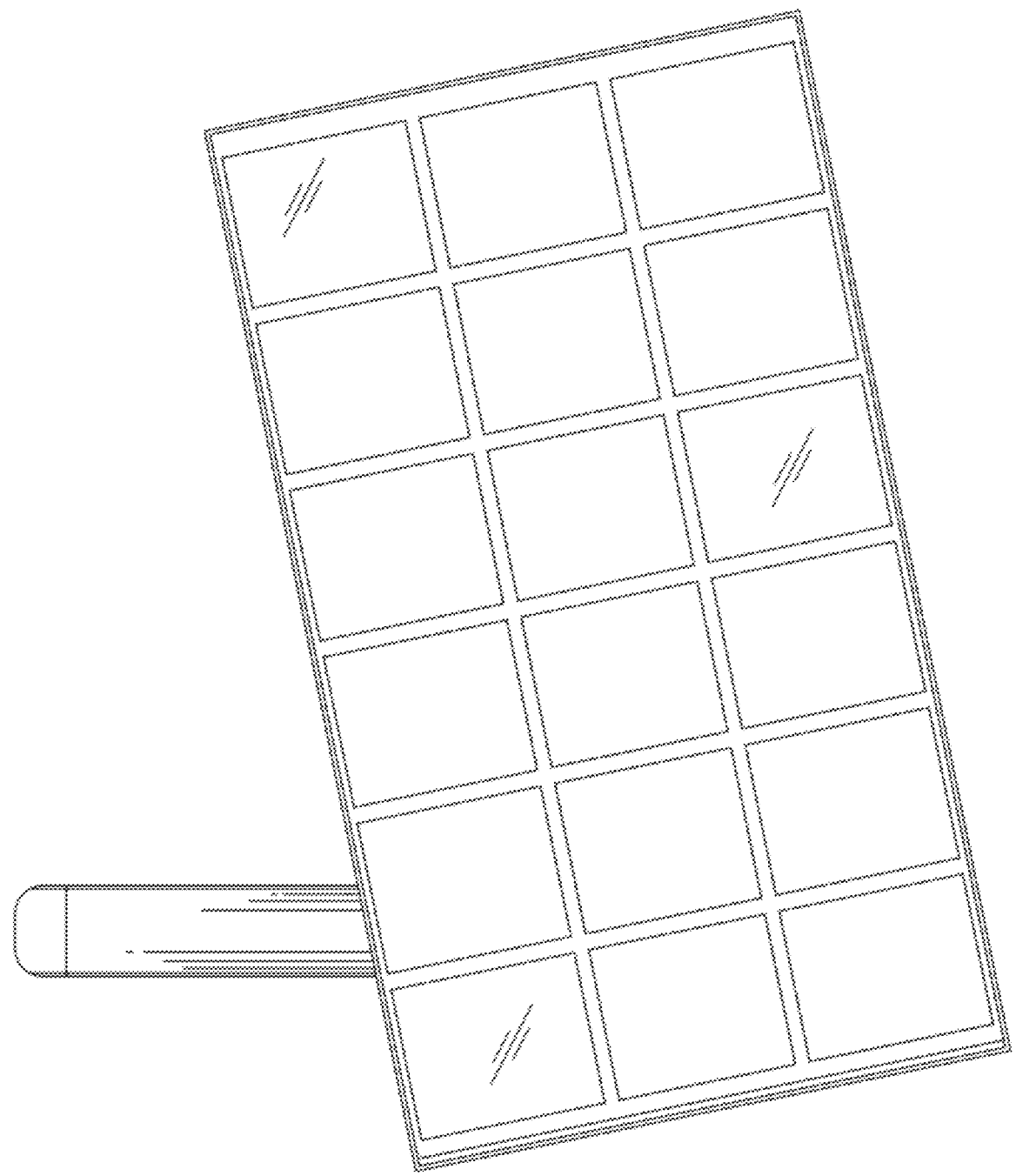
FIG. 18 depicts a top perspective view of the light fixture according to the embodiment depicted in FIG. 17.
Figure 19:
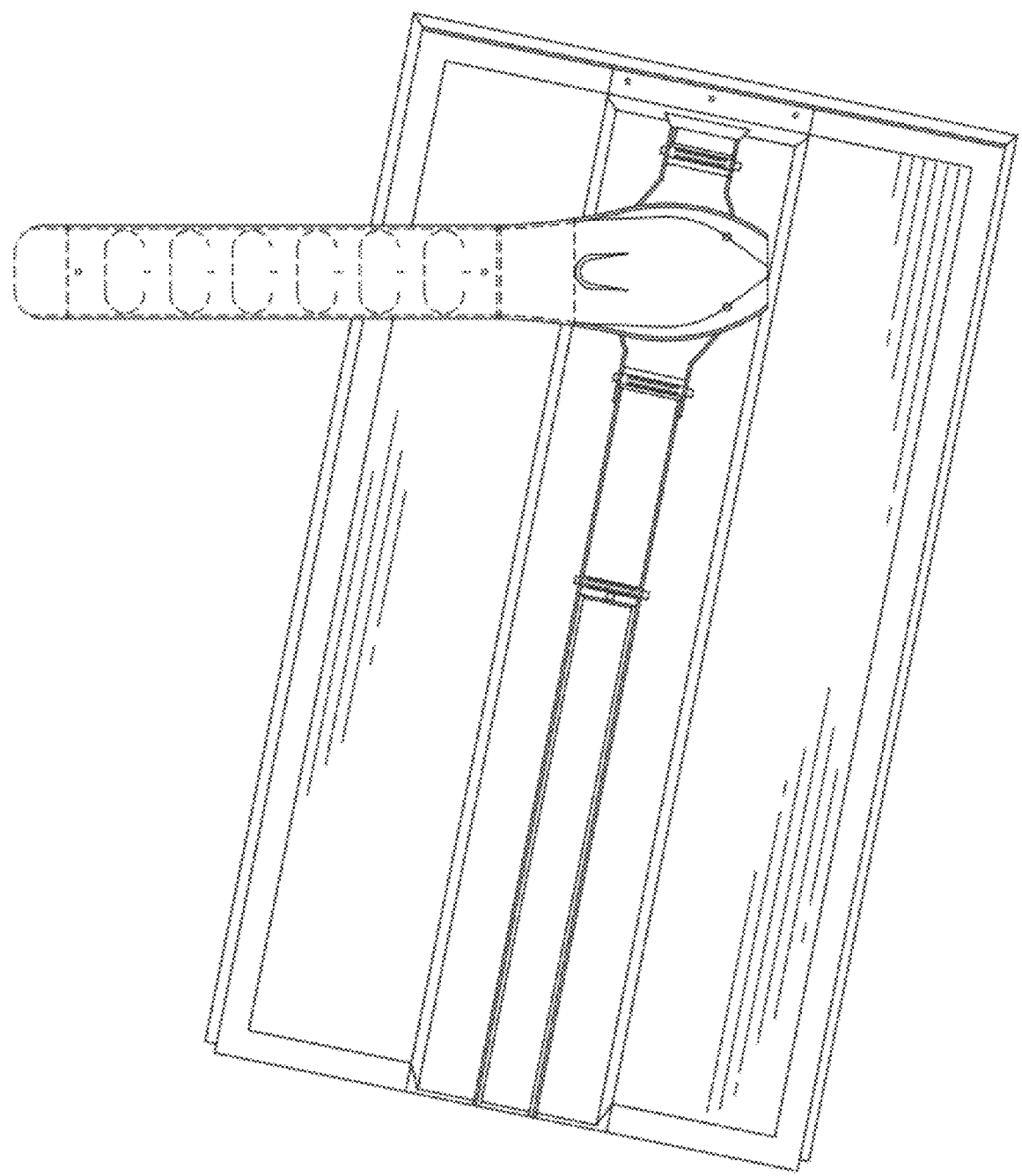
FIG. 19 depicts a bottom perspective view of the light fixture according to the embodiment depicted in FIG. 17.
Figure 20:
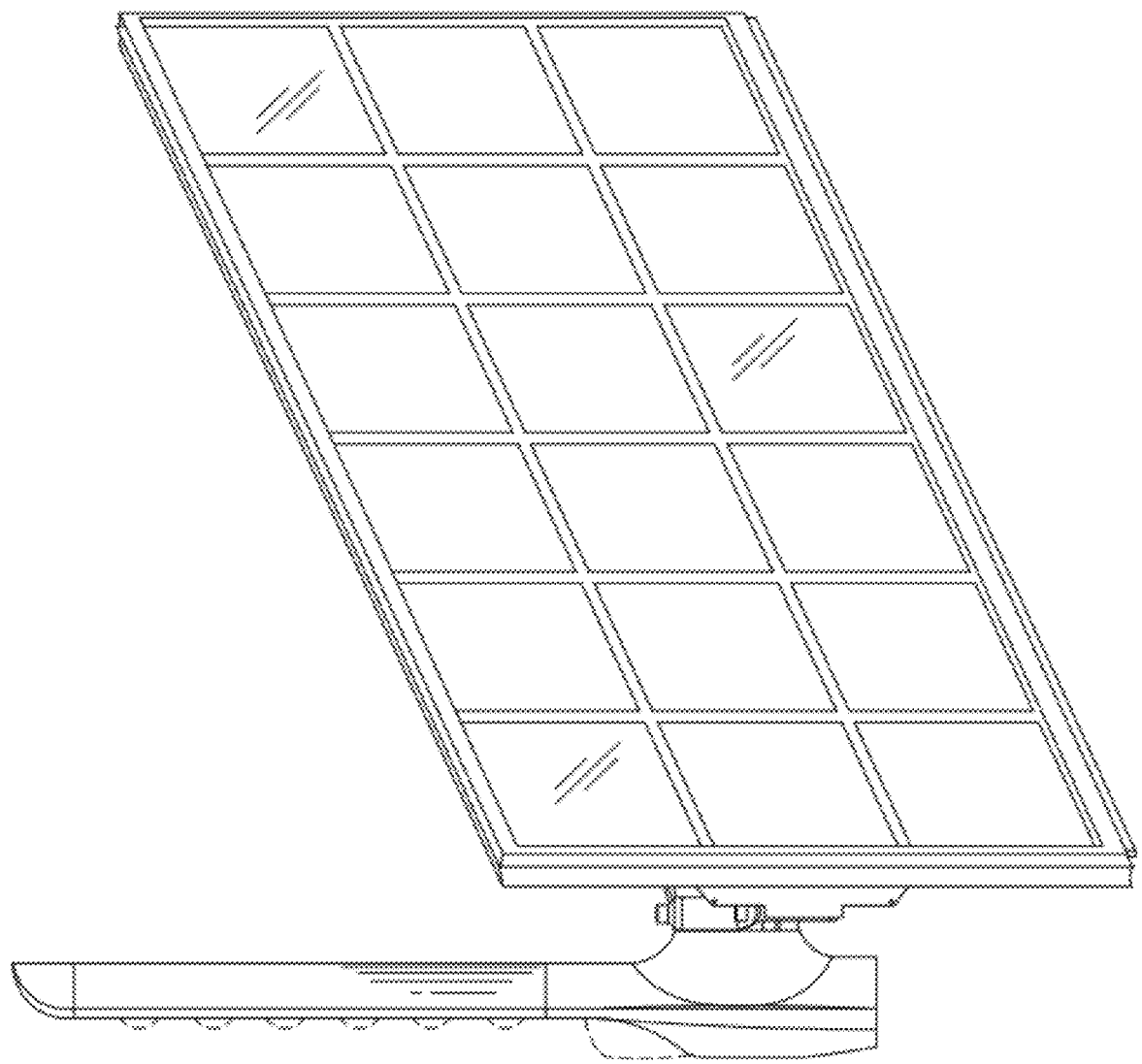
FIG. 20 depicts a front perspective view of the light fixture according to the embodiment depicted in FIG. 17.

According to an embodiment of the invention as depicted in FIG. 17, the ambient light sensor 1220 may be attached to the housing 1204 by an attachment mechanism 1224. The attachment mechanism 1224 may be configured to orient the ambient light sensor 1220 in a generally upward direction. Furthermore, the attachment mechanism 1224 may be configured to orient the ambient light sensor 1220, which in this depiction is a solar panel, at an angle. The angle may be selected so as to maximize the solar radiation incident upon the photovoltaic cells making up the operative surface 1222.

Figure 21:
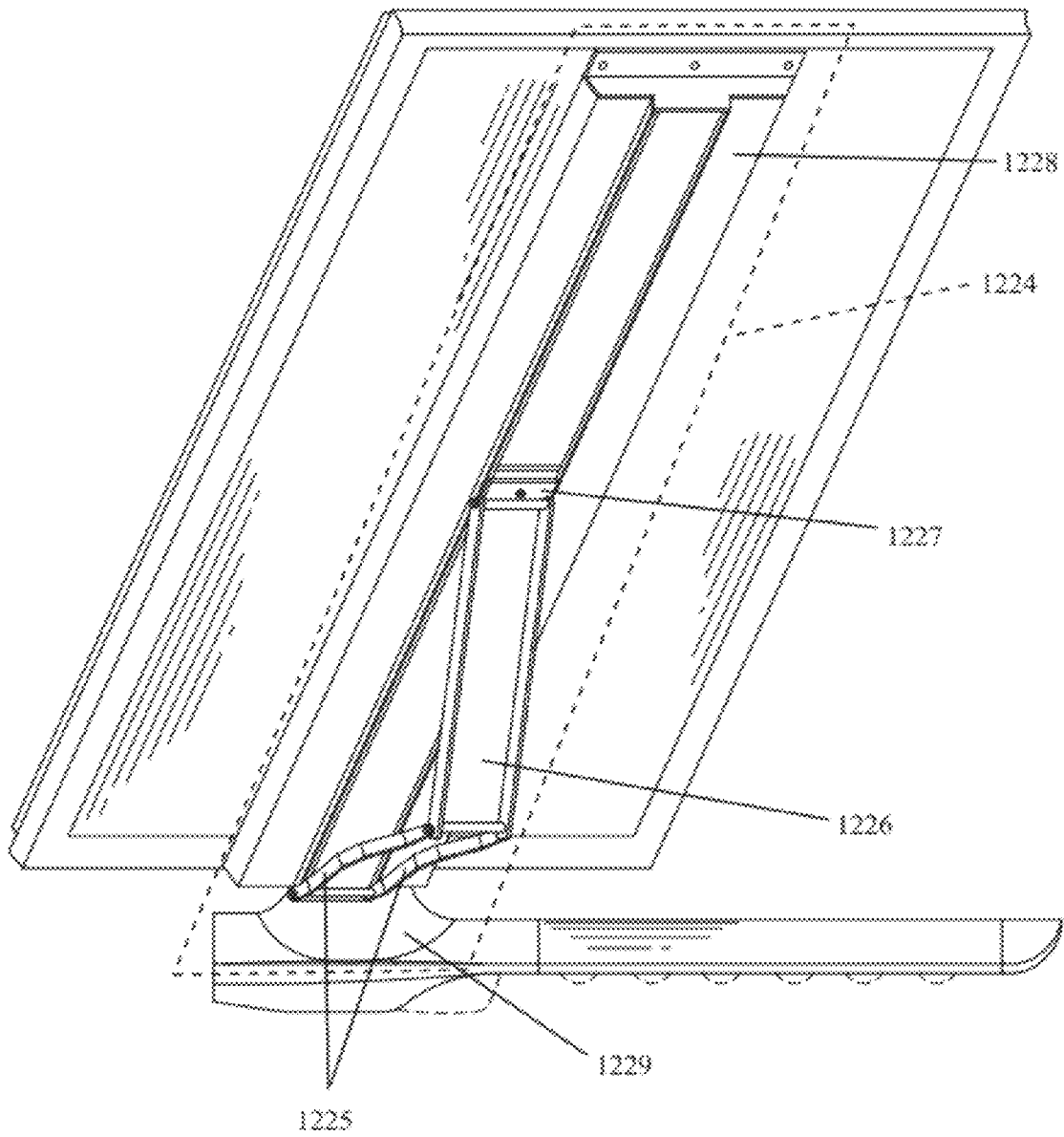
FIG. 21 depicts a rear perspective view of the light fixture according to the embodiment depicted in FIG. 17.
Figure 22:
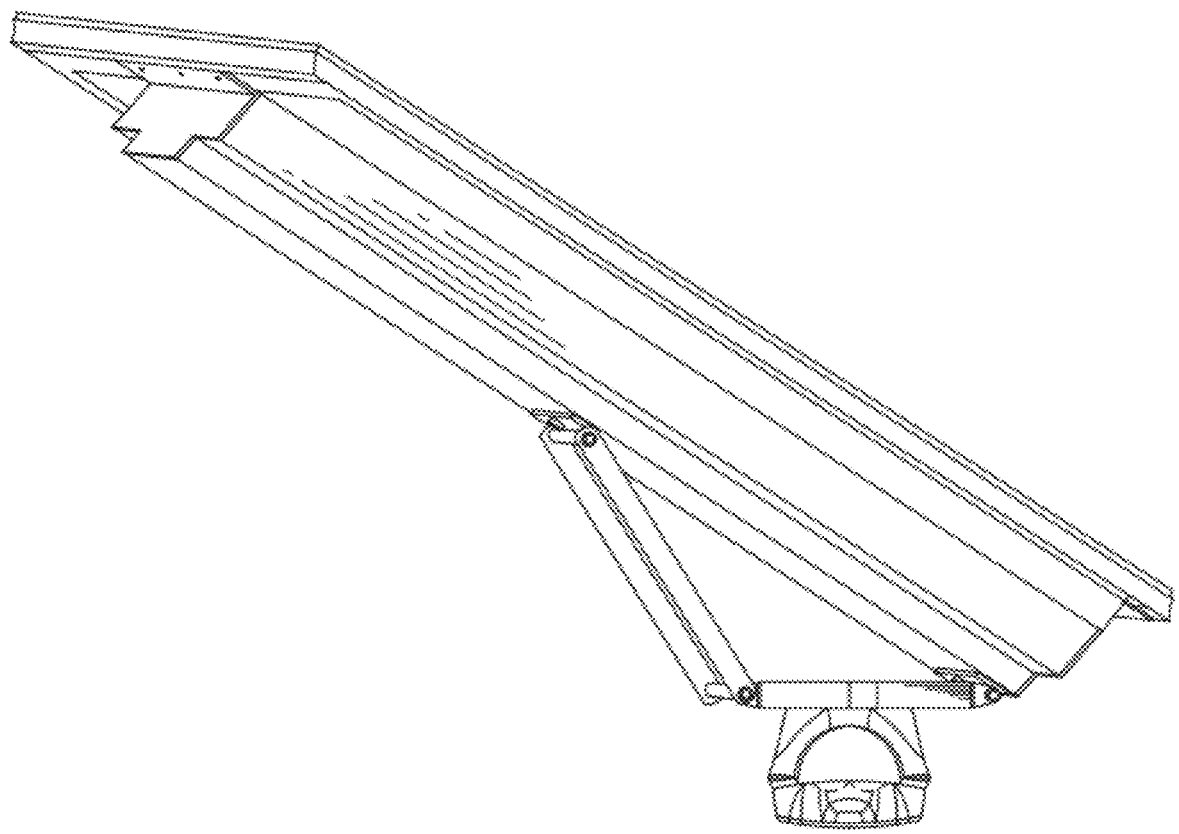
FIG. 22 depicts a first perspective view of the solar panel embodiment of the ambient light sensor detached from the light fixture according to the embodiment depicted in FIG. 17.
Figure 23:
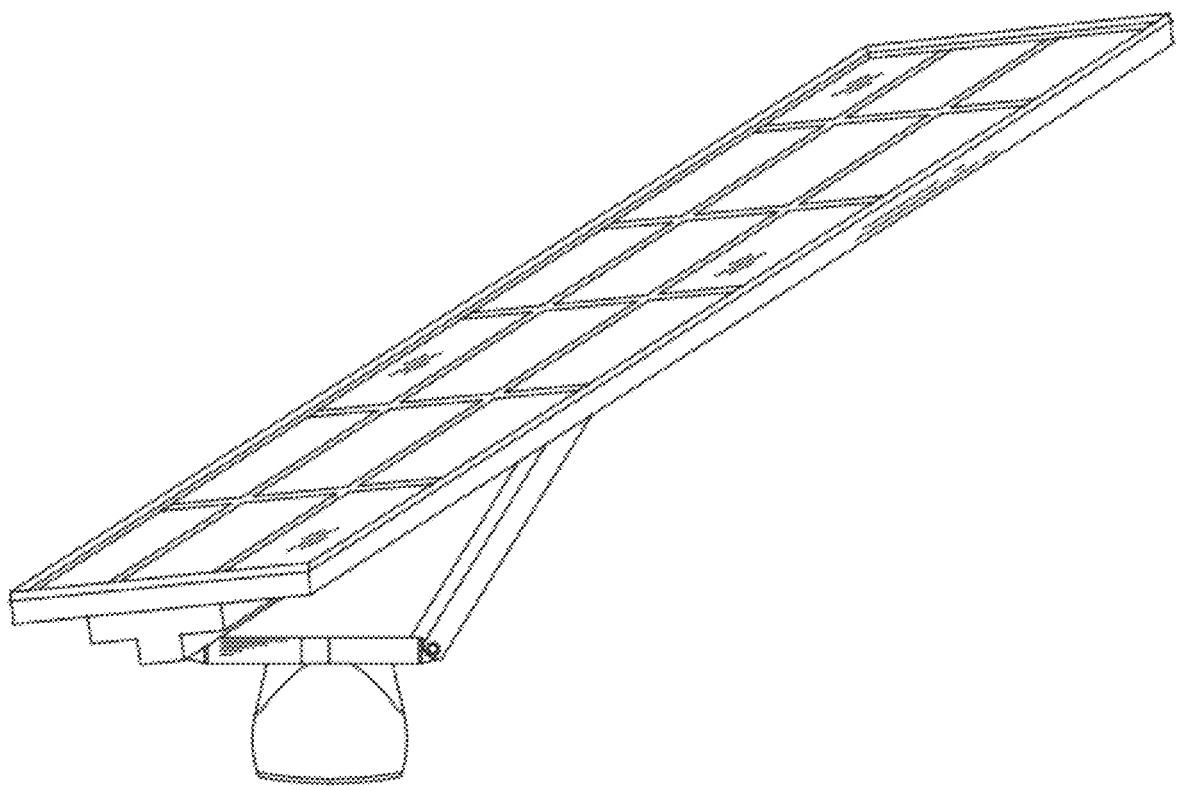
FIG. 23 depicts a second perspective view of the solar panel embodiment of the ambient light sensor detached from the light fixture according to the embodiment depicted in FIG. 17.

Referring now to FIG. 21, in an embodiment of the present invention, the attachment mechanism 1224 may further be rotatably coupled to the housing 1204 thereby permitting the ambient light sensor 1220 to rotate with respect to the housing 1204. Furthermore, the attachment mechanism 1224 may further include a collapsible structure comprising a pair of support arms 1225, an intermediate member 1226, a slidable member 1227, a track 1228, and a base member 1229 rotatably coupled to the housing 1204. The track 1228 may be fixedly attached to the ambient light sensor 1220, for instance, fixedly attached to a surface other than the operative surface 1222. The slidable member 1227 may be slidably attached to the track 1228, but constrained from detaching from the track 1228. The intermediate member 1226 may be rotatable coupled to the slidable member 1227 at a first end, and rotatable coupled to a first end the pair of support arms 1225 at a second end. Finally, the pair of support arms 1225 may be rotatably coupled to the base member 1229 at a second end. The repositioning of the slidable member 1227 permits the ambient light sensor to be oriented at different angles and is accomplished by the rotation of the intermediate member 1227 and the pair of support arms 1225.

In a further embodiment, the attachment mechanism 1224 may include a motor. The motor may be cause the attachment mechanism 1224 to rotate, thereby causing the attached ambient light sensor to rotate. The motor of the attachment mechanism 1224 may be configured to rotate the ambient light sensor 1220 so as to maximize the solar radiation incident upon the photovoltaic cells 1223 making up the operative surface 1222.

The electricity generated by the solar cell may be used to operate the various electrical elements of the light fixture 1200, including the light source 1210, the microcontroller 1230, a traffic sensor 1240, a communication device 1250, and any other device requiring electricity to operate described herein. Furthermore, the light fixture 1200 may include a battery system as described hereinabove. When the ambient light sensor 1220 is a solar panel, the ambient light intensity may be determined by measuring the output of the electricity generated by the solar panel.

Figure 24:
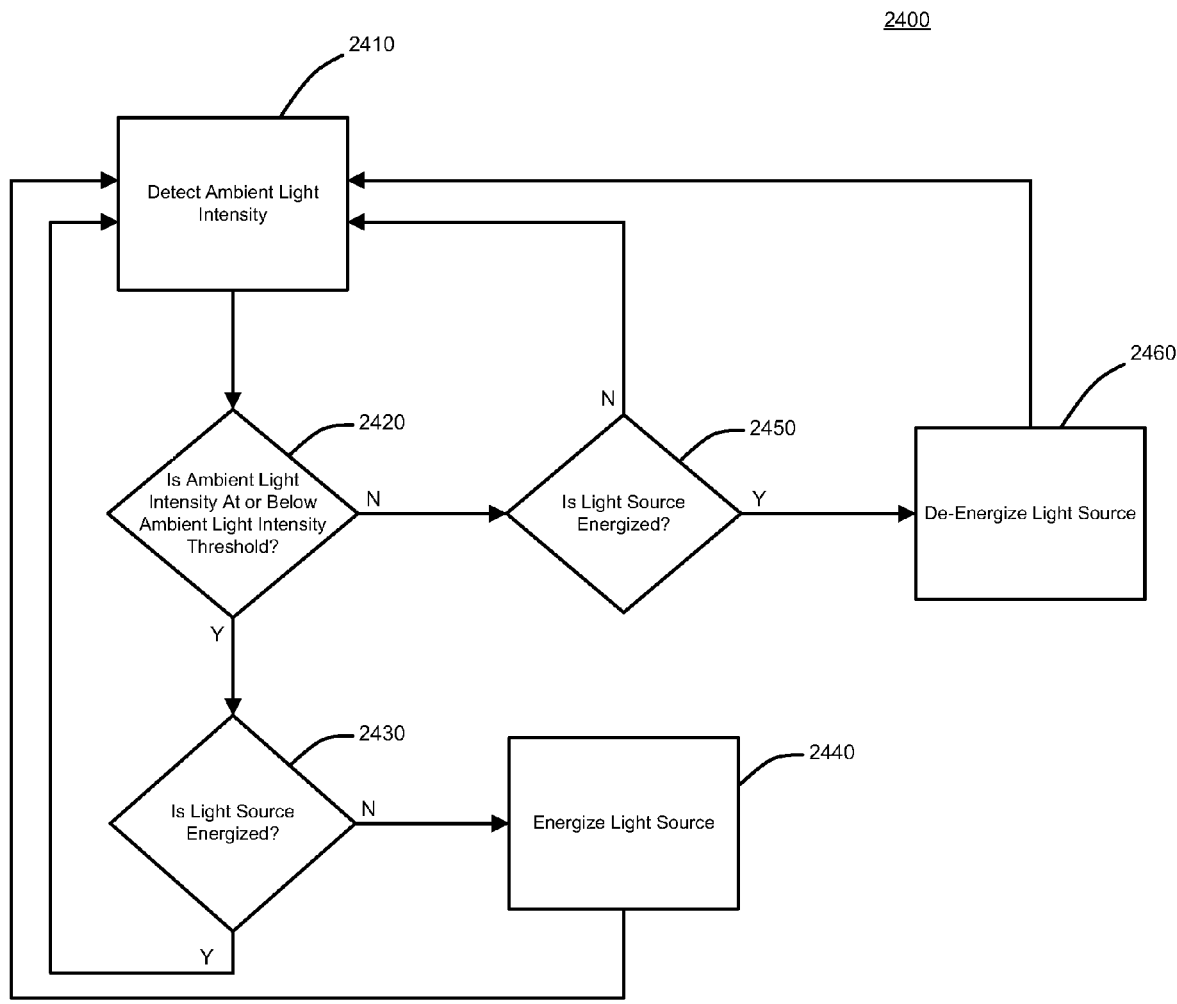
FIG. 24 presents a method of operation for an embodiment of the present invention.

Referring now to FIG. 24, a method 2400 of operating an embodiment of the invention is presented. The ambient light sensor 1220 may detect the ambient light intensity at step 2410. The microcontroller 1230 may then analyze the signal to determine if the intensity of the ambient light is at or below an intensity threshold at step 2420. For example, the ambient light intensity threshold may be at a light intensity approximately equal to $1.0 \times 10^2$ cd/m$^2$. If the ambient light intensity if at or below the intensity threshold, the microcontroller 1230 may then determine if the light source 1210 is energized at step 2430. If the light source 1210 is not energized, the microcontroller 1230 may energize the light source 1210 according to step 2440, causing the light source 1210 to emit light, and the process may return to step 2410. If the light source 1210 is already energized, the process may return to step 2410.

If the ambient light intensity is not at or below the threshold intensity, the microcontroller 1230 may determine if the light source 1210 is energized according to step 2450. If the light source 1210 is not energized, the process may return to step 2410. If the light source 1210 is energized, the microcontroller may de-energize the light source 1210 according to step 2460 before the process returns to step 2410. The method 2400 may be repeated in a loop, resulting in multiple varied energizations of the light source 1210. Furthermore, when the light source 1210 includes first and second clusters of light emitting elements 1212, 1214, the microcontroller 1230 may selectively operate one or both of the clusters of light emitting elements corresponding to the signal received from the ambient light sensor 1220. Light having differing wavelengths may be more effectively perceived by a human observe in different ambient light intensity scenarios.

Accordingly, the microcontroller 1230 may selectively operate the first and second clusters of light emitting elements 1212, 1214 to emit light having a wavelength corresponding to the more effective wavelength. For example, in a scenario where the ambient light sensor 1220 may indicate a sensed ambient light intensity within a first range of intensities of about $1.0 \times 10^{-2}$ cd/m$^2$ or less, scotopic light is more effectively perceived. Accordingly, the microcontroller 1230 may selectively energize one or more of the light emitting elements 1212, 1214 to emit light having a wavelength range that corresponds to a substantially scotopic wavelength rage, whether such light emitting elements are in either the first or second clusters of light emitting elements 1212, 1214. Similarly, if the ambient light sensor 1220 indicates a sensed ambient light intensity is within a second range of intensities approximately equal to or above $1.0 \times 10^1$ cd/m$^2$, photopic light is more effectively perceived. In such a scenario, the microcontroller 1230 may selectively energize one or more light emitting elements to emit light having a wavelength that corresponds to a substantially photopic wavelength range. Finally, if the ambient light sensor 1220 indicates a sensed ambient light intensity within a range of intensities between about $1.0 \times 10^1$ cd/m$^2$ and $1.0 \times 10^{-2}$ cd/m$^2$, mesopic light is more effectively perceived, and the microcontroller 1230 may selectively energize one or more light emitting elements to emit light having a wavelength corresponding to a substantially mesopic wavelength range. Moreover, the microcontroller 1230 may selectively illuminate various combinations of light emitting elements that emit light having a variety of wavelength ranges to produce a light having a perceived wavelength range within at least one of scotopic, photopic, and mesopic wavelength ranges. Each selective illumination of light emitting elements of the light source 1210 may comprise a separate and distinct energization state.

Figure 25:
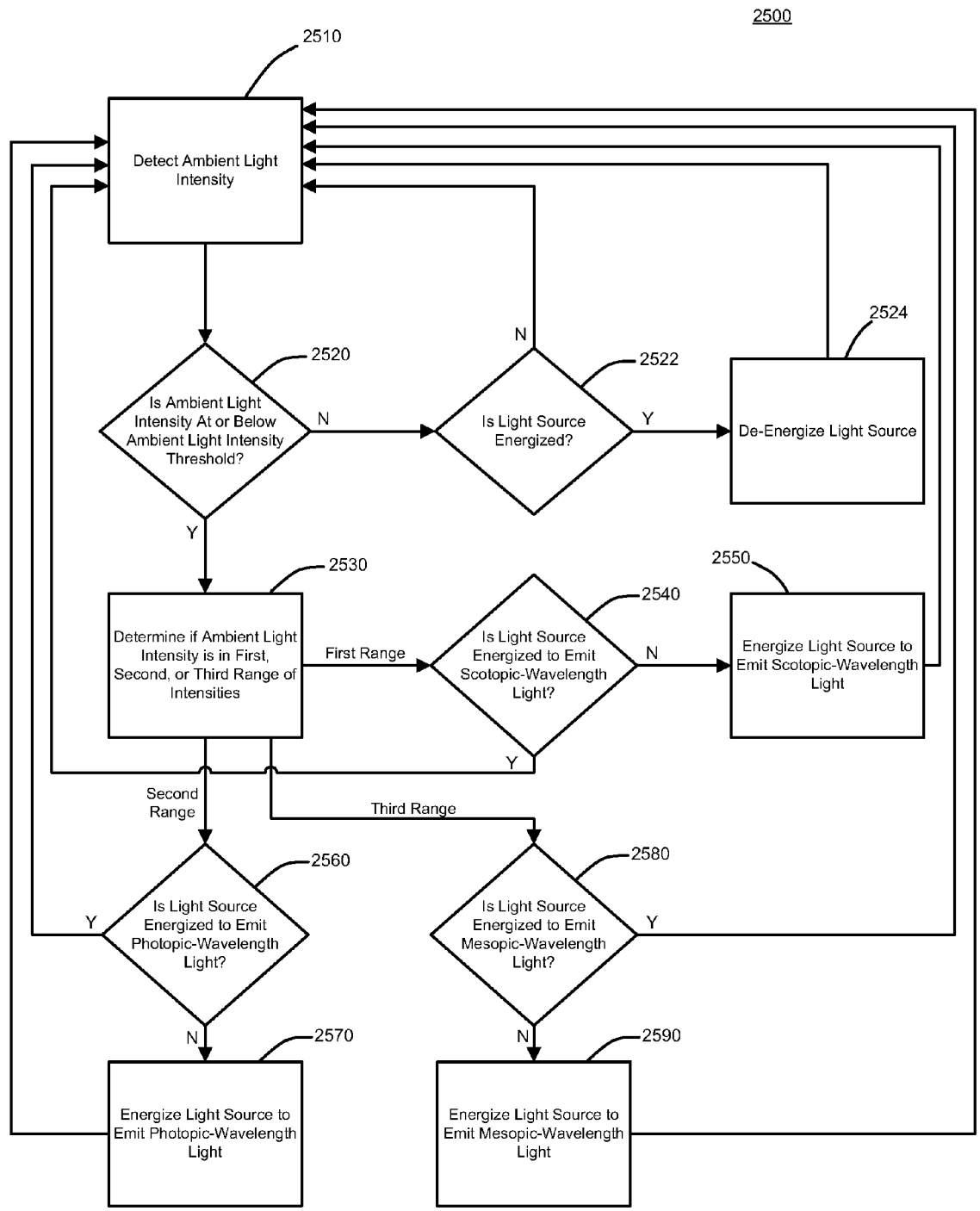
FIG. 25 presents a method of operation for an embodiment of the present invention.

Referring now to FIG. 25, a method 2500 of operating an embodiment of the invention is presented. The ambient light sensor 1220 may detect the ambient light intensity according to step 2510. The microcontroller 1230 may then determine if the ambient light intensity is at or below an intensity threshold described hereinabove according to step 2520. If the ambient light intensity is at or below the threshold intensity, the microcontroller 1230 may then determine if the ambient light intensity falls within the first, second, or third range of intensities described hereinabove, according to step 2530.

If the ambient light intensity falls within the first range, the microcontroller 1230 may then determine if the light source 1210 is energized to emit light having a wavelength range corresponding to a substantially scotopic wavelength, according to step 2540. If the light source 1210 is already energized to emit substantially scotopic-wavelength light, the process may return to step 2510. If the light source 1210 is not energized to emit substantially scotopic-wavelength light, the microcontroller 1230 may energize the light source 1210 as described hereinabove to cause the light source 1210 to emit substantially scotopic-wavelength light, according to step 2550. The process may then return to step 2510.

If the ambient light intensity falls within the second range, the microcontroller 1230 may then determine if the light source 1210 is energized to emit light having a wavelength range corresponding to a substantially photopic wavelength, according to step 2560. If the light source 1210 is already energized to emit substantially photopic-wavelength light, the process may return to step 2510. If the light source 1210 is not energized to emit substantially photopic-wavelength light, the microcontroller 1230 may energize the light source 1210 as described hereinabove to cause the light source 1210 to emit substantially photopic-wavelength light, according to step 2570. The process may then return to step 2510.

If the ambient light intensity falls within the third range, the microcontroller 1230 may then determine if the light source 1210 is energized to emit light having a wavelength range corresponding to a substantially mesopic wavelength, according to step 2580. If the light source 1210 is already energized to emit substantially mesopic-wavelength light, the process may return to step 2510. If the light source 1210 is not energized to emit substantially mesopic-wavelength light, the microcontroller 1230 may energize the light source 1210 as described hereinabove to cause the light source 1210 to emit substantially mesopic-wavelength light, according to step 2590. The process may then return to step 2510.

Now turning back to step 2520, if the microcontroller 1230 determines the ambient light intensity is not at or below the threshold intensity, the microcontroller 1230 may determine if the light source 1210 is energized according to step 2522. If the light source 1210 is not energized, the process may return to step 2510. If the light source 1210 is energized, the microcontroller may de-energize the light source 1210 according to step 2524, at which point the process may return to step 2510. The method 2500 may be repeated in a loop, resulting in multiple varied energizations of the light source 1210.

The light source 1210 may be configured to emit light at more than one intensity. For example, the light source 1210 may be configured to emit light at a first intensity, and the microcontroller 1230 may selectively cause the light source 1210 to emit light at an intensity greater than the first intensity, or less than the first intensity.

In one embodiment, the microcontroller 1230 may energize the light source 1210 to emit light having an intensity greater than the first intensity when the ambient light sensor 1220 signal indicates an ambient light intensity within a first range, and to emit light having an intensity less than the first intensity when the signal indicates ambient light intensity within a second range. More specifically, the first ambient light intensity range may be more intense than the second ambient light intensity range. Further, the light emitted in the first range may correspond to a maximum light output, and the light emitted in the second range may correspond to a minimum light output.

Figure 26:
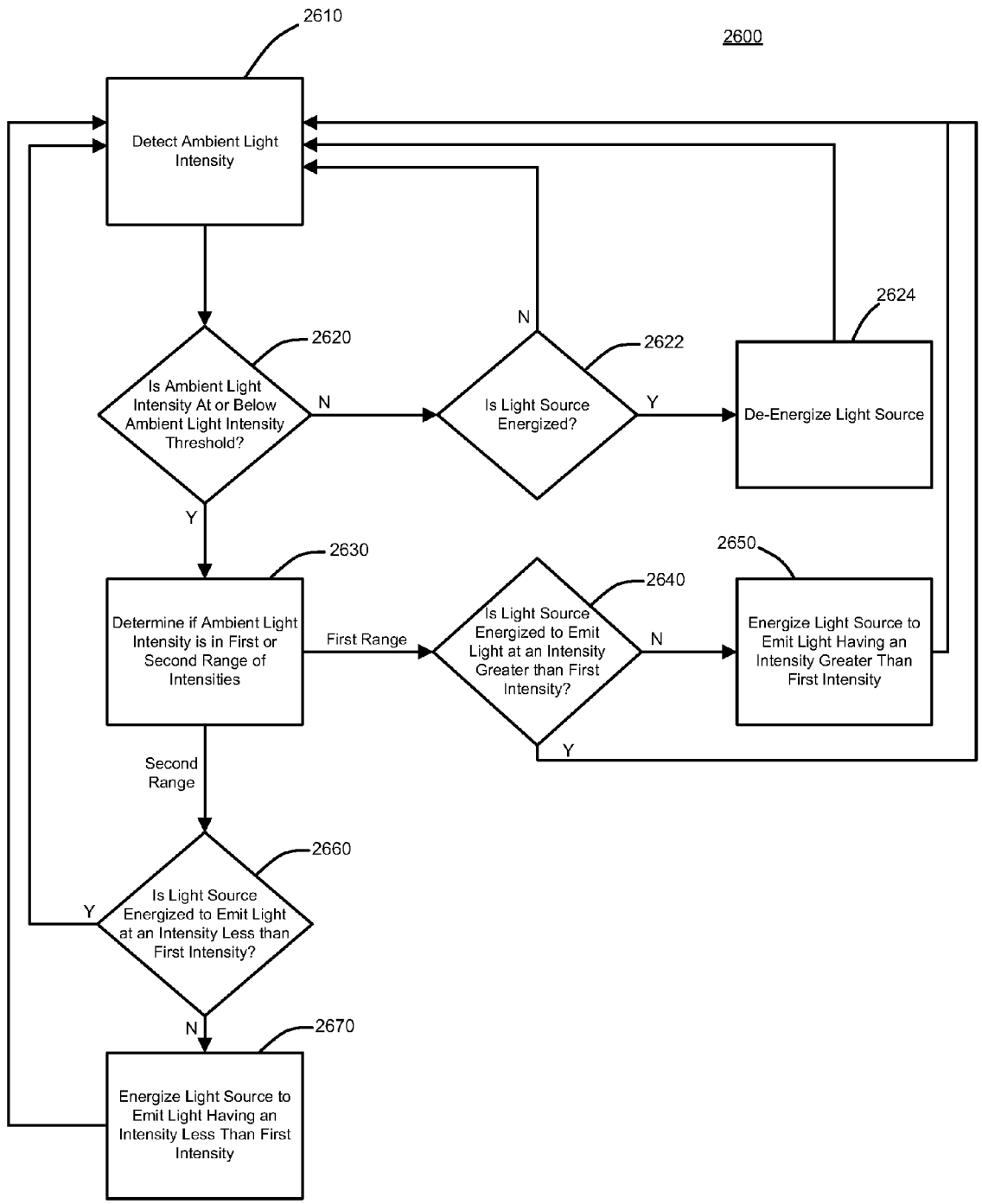
FIG. 26 presents a method of operation for an embodiment of the present invention.

Referring now to FIG. 26, a method 2600 of operating an embodiment of the invention is presented. The ambient light sensor 1220 may detect the ambient light intensity according to step 2610. The microcontroller 1230 may then determine if the ambient light intensity is at or below an intensity threshold described hereinabove according to step 2620. If the ambient light intensity is at or below the threshold intensity, the microcontroller 1230 may then determine if the ambient light intensity falls within the first or second range of intensities described hereinabove, according to step 2630.

If the ambient light intensity falls within the first range of intensities, the microcontroller 1230 may then determine if the light source 1210 is energized to emit light having an intensity greater than the first intensity, according to step 2640. If the light source 1210 is energized to emit light having an intensity greater than the first intensity, the process may return to step 2610. If not, the microcontroller 1230 may energize the light source to emit light having an intensity greater than the first intensity, according to step 2650. Thereafter, the process may return to step 2610.

If the ambient light intensity falls within the second range of intensities, the microcontroller 1230 may then determine if the light source 1210 is energized to emit light having an intensity less than the first intensity, according to step 2660. If the light source 1210 is energized to emit light having an intensity less than the first intensity, the process may return to step 2610. If not, the microcontroller 1230 may energize the light source to emit light having an intensity less than the first intensity, according to step 2670. Thereafter, the process may return to step 2610.

Now turning back to step 2620, if the microcontroller 1230 determines the ambient light intensity is not at or below the threshold intensity, the microcontroller 1230 may determine if the light source 1210 is energized according to step 2622. If the light source 1210 is not energized, the process may return to step 2610. If the light source 1210 is energized, the microcontroller may de-energize the light source 1210 according to step 2624, at which point the process may return to step 2510. The method 2600 may be repeated in a loop, resulting in multiple varied energizations of the light source 1210.

The light source 1210 may emit light at differing intensities by selectively energizing the first and second clusters of light emitting elements 1212, 1214. Moreover, the first and second clusters of light emitting elements 1212, 1214 may be configured to have different light outputs, thereby providing greater flexibility in the intensity of light emitted by the light source 1210.

The light fixture 1200, according to an embodiment of the present invention, may further include a traffic sensor 1240 functionally coupled to the microcontroller 1230. The traffic sensor 1240 may be any device that can measure a traffic status, such as, without limitation, optical sensors and acoustic sensors. Optical sensors may include CODs, complementary metal-oxide-semiconductors, and laser systems. The statuses that the traffic sensor 1240 may measure may include, without limitation, traffic volume, traffic direction, traffic speed, traffic distance, or any other type of traffic data that may be readily ascertainable.

As shown in FIG. 12, the traffic sensor 1240 may include a detection field 1242 within which it may perform measurements. The traffic sensor 1240 may be oriented such that the detection field 1242 includes a street, road, sidewalk, or any other thoroughfare. For example, the traffic sensor 1240 may be attached to an outer surface of the housing 1204, wherein the detection field 1242 may be directed generally downwards. When an object moves into the detection field 1242, the traffic sensor 1240 may detect the presence of the measurement by virtue of its operational configuration, i.e. optical or acoustical measurement. Additionally, the traffic sensor 1240 may determine a measurement of at least one of the traffic statuses listed hereinabove. For example, and not meant as a limitation, the traffic sensor 1240 may determine the direction of travel of the object, or the distance of the object, or both. Moreover, when multiple objects are detected entering the detection field 1242, the detection by the traffic sensor 1240 of each object may enable the calculation of a traffic volume. The measurements performed by the traffic sensor 1240 may be transmitted to the microcontroller 1230.

Figure 27:
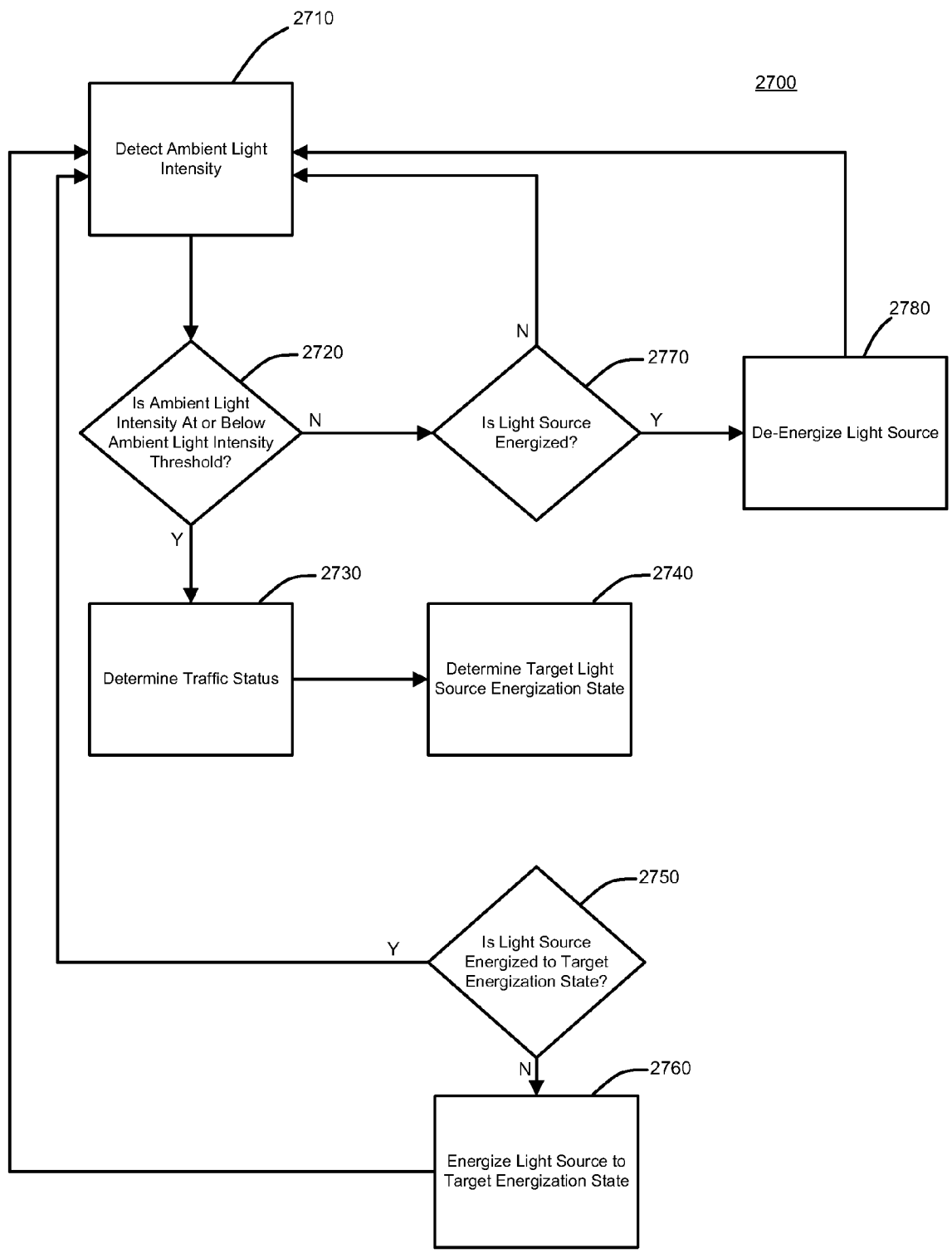
FIG. 27 presents a method of operation for an embodiment of the present invention.

Referring now to FIG. 27, a method 2700 of operating an embodiment of the invention is presented. The ambient light sensor 1220 may detect the ambient light intensity according to step 2710. The microcontroller 1230 may then determine if the ambient light intensity is at or below an intensity threshold described hereinabove according to step 2720.

If the ambient light intensity is at or below the threshold intensity, the traffic sensor 1240 may determine a traffic status as described hereinabove according to step 2730. The microcontroller 1230 may then determine a target light source energization state according to claim 2740. For example, and without limitation, the microcontroller 1230 may energize the light source 1210 to a first state when the traffic status falls within a first range, and energize the light source 1210 to a second state when the traffic status falls within a second range. Furthermore, the microcontroller 1230 may selectively energize the light source 1210 to a state that is proportional to a combination of the traffic status received from the traffic sensor 1240 and the ambient light intensity measured by the ambient light sensor 1220, thereby determining an estimated status.

After determining the target energization state, the microcontroller 1230 may determine if the light source 1210 is energized to the target energization state, according to step 2750. If the light source 1210 is energized to the target energization state, the process may return to step 2710. If not, the microcontroller 1230 may energize the light source 1210 to the target energization state, according to step 2760. Thereafter, the process may return to step 2710.

If, at step 2720, the microcontroller 1230 determines the ambient light intensity is not at or below the ambient light intensity threshold, the microcontroller 1230 may then determine if the light source 1210 is energized, according to step 2770. If the light source 1210 is not energized, the process may return to step 2710. If the light source 1210 is energized, the microcontroller 1230 may de-energize the light source 1210 according to step 2780. Thereafter, the process may return to step 2710. The method 2700 may be repeated in a loop, resulting in multiple varied energizations of the light source 1210.

In a non-limiting example, the traffic status may include a traffic volume, indicating the number of vehicles on a thoroughfare. An increased volume of vehicles accordingly means there are an increased number of headlights on a given section of road. When the ambient light intensity requires additional illumination, i.e. when the ambient light intensity falls beneath the ambient light intensity threshold, it is assumed that the vehicles detected by the traffic sensor 1240 will illuminate their headlights, providing illumination not only for the operator of that vehicle, but also providing a illumination for vehicles proximate thereto. A higher traffic rate corresponds to more vehicles in closer proximity to one another, each providing illumination one another. Accordingly, as the amount of illumination provided by headlights increases, the need for an external source of light, such as a light fixture, is reduced. Therefore, when the ambient light intensity is below the ambient light intensity threshold, the microcontroller 1230 may selectively energize the light source 1210 in an inversely proportional relationship to the traffic volume. More specifically, the microcontroller 1230 may associate energizing the light source 1210 to emit light having a first intensity with a first range of traffic volumes and a second intensity with a second range of traffic volumes. The differing intensities may be accomplished by selectively energizing one of the first and second dusters of light emitting elements 1212, 1214, or both. The first range of traffic volumes may be less than the second range of traffic volumes. Accordingly, the first intensity may be greater than the second intensity.

Moreover, the intensity of light emitted by the light source 1210 may be modified to accommodate estimated pedestrian traffic. In general, rural areas have less pedestrian traffic, and urban areas have greater pedestrian traffic. These levels of traffic also generally correspond to vehicular traffic, where rural areas have less vehicular traffic and urban areas have greater vehicular traffic. Therefore, the light source 1210 may be energized to emit light proportionally to the estimated pedestrian traffic. In a first embodiment, pedestrian traffic may be grouped into three ranges indicating high pedestrian traffic, medium pedestrian traffic, and low pedestrian traffic. Accordingly, ranges for traffic volumes may be similarly grouped. Furthermore, energization states for the light source 1210 corresponding to each of the pedestrian traffic ranges may also be provided, resulting in different levels of illumination for each of the pedestrian traffic ranges. For example, in high pedestrian traffic, the light source 1210 may be energized to emit 3.8 lux, while in medium pedestrian traffic, the light source 1210 may be energized to emit 3.2 lux, and in low pedestrian traffic, the light source 1210 may be energized to emit 2.7 lux.

In another non-limiting example, the traffic status may include a traffic distance. More specifically, the traffic sensor 1240 may produce a first measurement of a target, such as a vehicle, in the detection field 1242 and transmit that measurement to the microcontroller 1230. Either the microcontroller 1230 or the traffic sensor 1240 may determine an approximate distance of the target from the first measurement. The microcontroller 1230 may then energize the light source 1210 to a first state, causing the light source 1210 to emit a light having a first wavelength range.

After an incremental amount of time, the traffic sensor 1240 may produce a second measurement of the same target and transmit that measurement to the microcontroller 1230. Again, either the microcontroller 1230 or the traffic sensor 1240 may determine an approximate distance of the target in the second measurement. The microcontroller 1230 may then energize the light source 1210 to emit a light having a second wavelength range.

In general, the closer a target is to the light fixture 1200, light having a generally photopic wavelength range is desirable, and the further a target is from the light fixture 1200, light having a generally scotopic wavelength range is desirable. Accordingly, target distances may be categorized into two ranges, with a first range being relatively further than the second range. When a target distance is within the first range, the microcontroller 1230 may energize the light source 1210 to emit light having a wavelength range corresponding to a substantially scotopic wavelength range, such as by selectively energizing at least one of the first and second clusters of light emitting elements 1212, 1214. When a target distance is within the second range, the microcontroller 1230 may energize the light source 1210 to emit light having a wavelength range corresponding to a substantially photopic wavelength range, such as by selectively energizing at least one of the first and second dusters of light emitting elements 1212, 1214.

Moreover, a plurality of ranges of traffic distances may be included. Accordingly, a plurality of energization states of the light source 1210 are provided, with each energization state having a wavelength range that is desirable for its associated distance range. The plurality of energization states may be ordered so as to form a sequential order of energization, resulting in a gradual transition from substantially scotopic light to substantially mesopic light to substantially photopic light, and similarly, from substantially photopic light to substantially mesopic light to substantially scotopic light.

*The light fixture 1200 may further include a communication device 1250. The communication device 1250 may be any device that enables the transmission of data to another device. Furthermore, the communication device 1250 may also be any device that permits the reception of data from another device. The communication device 1250 may communicate using any communication medium or standard, such as wired and wireless communication, including IEEE 802 standards, radio frequency, visible light communication, acoustic communication, and all other methods of communication known in the art. Furthermore, the communication device 1250 may communicate with a network of devices. For example, the communication device 1250 may permit the light fixture 1200 to functionally associate with a traffic network, such as a system to monitor traffic volume and provide a traffic count.

The communication device 1250 may be configured to transmit any type of data produced by the electronic devices of the light fixture 1200, including the light source 1210, ambient light sensor 1220, the microcontroller 1230, or the traffic sensor 1240. For example, and not by limitation, the data may include an ambient light intensity measurement, or a traffic status measurement. Furthermore, the communication device 1250 may be configured to transmit any data received by the light fixture 1200, such as, for example, data received from a traffic network described hereinabove.

Figure 28:
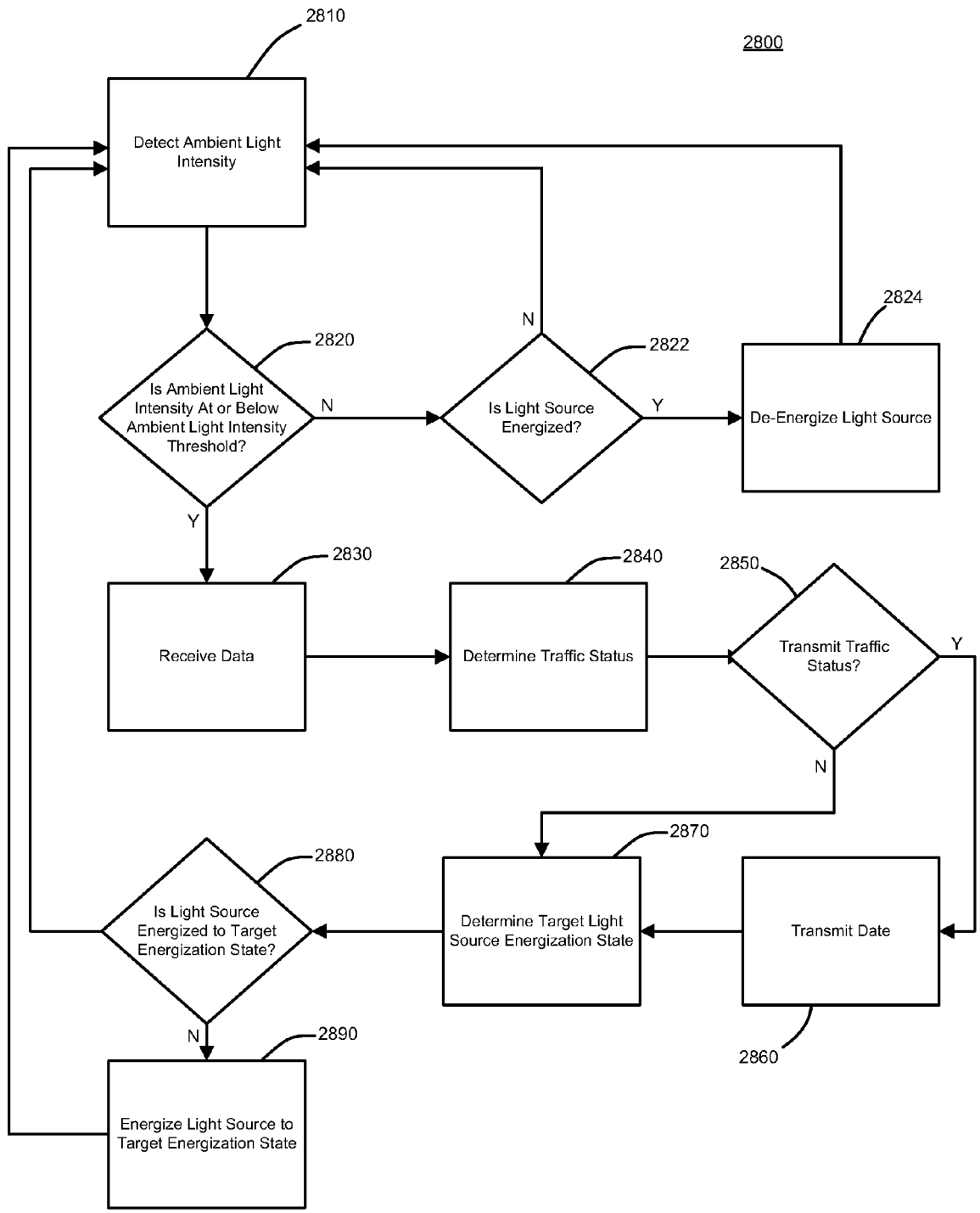
FIG. 28 presents a method of operation for an embodiment of the present invention.

Referring now to FIG. 28, a method 2800 of operating an embodiment of the invention is presented. The ambient light sensor 1220 may detect the ambient light intensity according to step 2810. The microcontroller 1230 may then determine if the ambient light intensity is at or below an intensity threshold described hereinabove according to step 2820.

If the ambient light intensity is at or below the ambient light intensity threshold, the communication device 1250 may receive data from another light fixture, according to step 2830. The communication device 1250 may further transmit the received data to the microcontroller 1230. The traffic sensor 1240 may determine a traffic status according to step 2840 and transmit that status to the microcontroller 1230.

Once the microcontroller 1230 has received the traffic status, it may then determine whether or not to transmit the traffic status, according to step 2850. The microcontroller 1230 may make this determination based upon a number of factors, including, without limitation, the previous traffic status and the time interval since the microcontroller 1230 has previously transmitted a status. If the microcontroller 1230 determines to transmit the status, it may do so via the communication device 1250 according to step 2860. Once the traffic status is transmitted, the process may proceed to step 2870. If the microcontroller 1230 determines not to transmit the traffic status, the process may proceed to step 2870.

The microcontroller 1230 may determine a target energization state for the light source, according to step 2870. The target energization state may be determined according to a number of factors, including, but not limited to, the data received at step 2830 and the traffic status determined at step 2840.

Once the microcontroller 1230 has determined the target energization state, it may then determine if the light source 1210 is energized to the target energization state, according to step 2880. If the light source is energized to the target energization state, the process may return to step 2810. If not, the microcontroller 1230 may energize the light source 1210 to the target energization state according to step 2890. Thereafter, the process may return to step 2810.

If, at step 2820, the microcontroller 1230 determines the ambient light intensity is not at or below the ambient light intensity threshold, the microcontroller 1230 may then determine if the light source 1210 is energized, according to step 2822. If the light source 1210 is not energized, the process may return to step 2810. If the light source 1210 is energized, the microcontroller 1230 may de-energize the light source 1210 according to step 2824. Thereafter, the process may return to step 2710. The method 2800 may be repeated in a loop, resulting in multiple varied energizations of the light source 1210.

Figure 14:
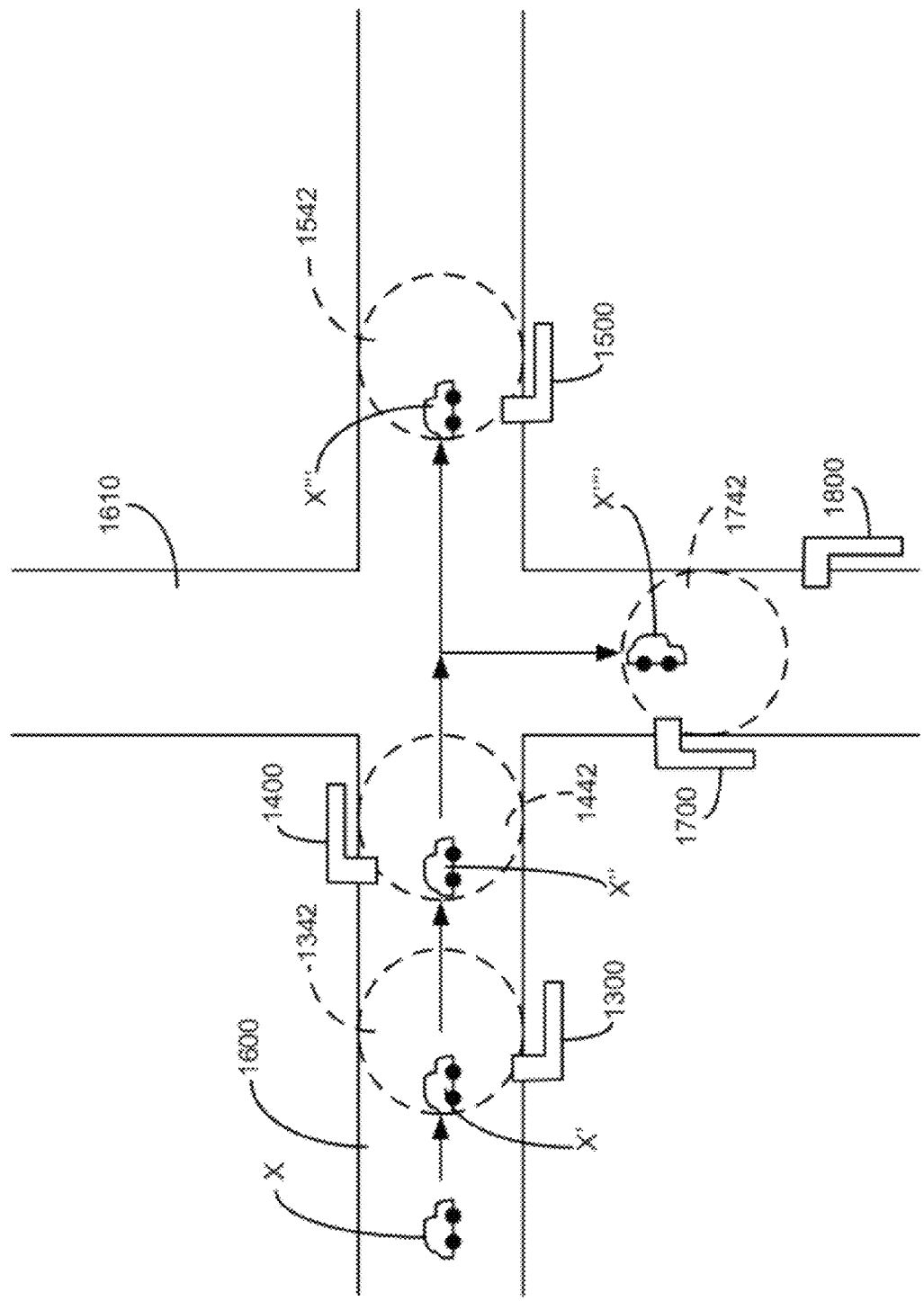
FIG. 14 depicts a network of light fixtures according to an embodiment of the invention.
Figure 15:
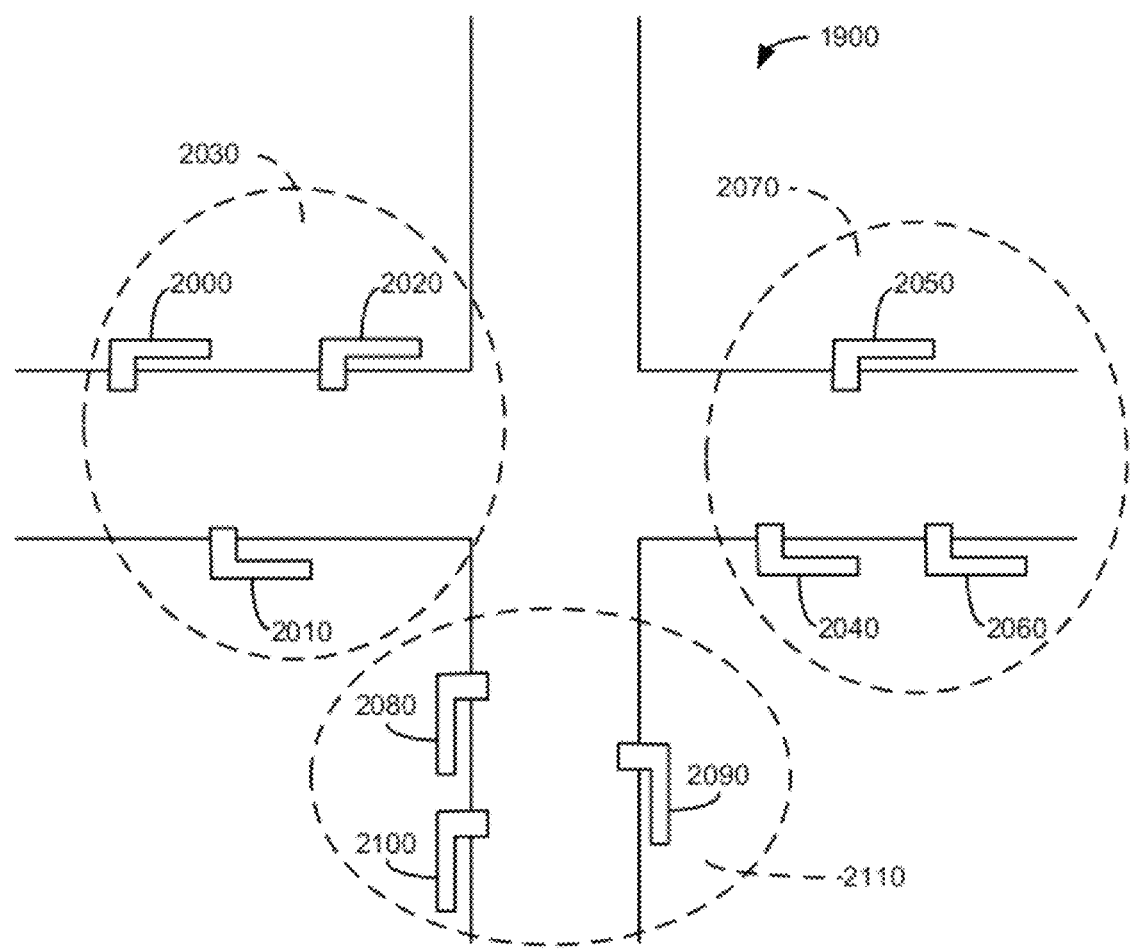
FIG. 15 depicts a nodal network of light fixtures according to an embodiment of the invention.

As perhaps best illustrated in FIGS. 14 and 15, in an embodiment of the present invention, a network of light fixtures may be provided. At least two light fixtures 1300, 1400 generally as depicted in FIG. 14 and described in the accompanying text may be provided, each light fixture including a light source, an ambient light sensor, a microcontroller, a traffic sensor, and a communication device. The communication devices 1350, 1450 may be configured to transmit data. Furthermore, each of the communication devices 1350, 1450 may be configured to receive data from the communication device of another light fixture. In other words, in this embodiment of the present invention, the light fixtures 1300, 1400, are configured to communicate with one another. The attached illustration depicts the network of light fixtures as including more than two, and the light fixtures in the appended drawings are labeled as 1300, 1400, 1500, 1700 and 1800. Those skilled in the art will appreciate that any number of light fixtures may be provided in such a network. When two or more communication devices are thus configured, a network of light fixtures is produced.

Furthermore, the communication devices of light fixtures 1300 1400 may be configured to transmit data received from each other to any other communication device within the network, for example, to a communication device of a third light fixture 1500, thereby forming a mesh network. Each light fixture within the mesh network may receive data from any other connected light fixture and may similarly transmit data to any connected light fixture, including data received from another light fixture. Data transmitted by the communication devices may include, without limitation, ambient light intensity, traffic volume, traffic direction, traffic speed, and traffic distance.

Each of the light fixtures 1300, 1400, 1500 may utilize data received from any of the other light fixtures 1300, 1400, 1500 in energizing its respective light source. For example, as shown in FIG. 14, light fixture 1300 may be in a first position along a street 1600, light fixture 1400 may be in a second position along the street 1600, and light fixture 1500 may be in a third position along the street 1600. A vehicle X may be traveling along the street 1600, beginning at a first position X' and travelling to positions X" and either X'" or X"". When the vehicle X is in position X', traffic sensor of light fixture 1300 may detect the vehicle X in a detection field 1342. If the ambient light sensor of light fixture 1300 indicates the ambient light intensity is below the ambient light intensity threshold, the microcontroller of light fixture 1300 may energize the light source of light fixture 1300, thereby providing illumination in the general area of X'.

The communication device of light fixture 1300 may then transmit data to the communication devices of light fixtures 1400 and 1500, providing data that may include traffic status, such as traffic volume, traffic direction, traffic speed, and traffic distance, as well as ambient light intensity information. In this instance, the communication device of light fixture 1300 may transmit data related to vehicle X's position, speed, and direction of travel. In order to provide for efficient lighting, each light fixture 1300, 1400, 1500, may be configured to have positional awareness with respect to each other light fixture within the network. For example, light fixtures 1400 and 1500 may be configured to be aware that in the direction of travel of vehicle X, there is a likelihood that vehicle X will travel in proximity to the light fixture, and thus the light fixture should illuminate. Therefore, when the light fixtures 1400 and 1500 receive data from light fixture 1300, each of the respective microcontrollers of light fixtures 1400 and 1500 may determine whether to energize its respective light source. This determination may be made based upon a variety of criteria, including vehicle speed, vehicle direction of travel, and positional relationship to the light fixture providing the data. In the invention as depicted in FIG. 14, light fixture 1400, being the next light fixture in the direction of travel of the vehicle X, may decide to energize its light source. Accordingly, when vehicle X is in position X', light fixture 1400 illuminates ahead of vehicle X. This allows light fixture 1400 to be aware of the presence of vehicle X and the likelihood with which vehicle X will travel with proximity to light fixture 1400 before vehicle X may travel into detection field 1442.

Light fixture 1500, being the second light fixture in the direction of travel of the vehicle X, may be configured to optionally energize or not energize its light source, due to the presence of light fixture 1400 intermediate light fixtures 1300 and 1500.

FIG. 14 further depicts additional light fixtures 1700 and 1800 positioned along street 1610, where street 1610 intersects with and is non-parallel to street 1600.

As a continuation of the example discussed above and illustrated in FIG. 14, vehicle X may travel along the indicated direction of travel and reach position X". In this position, the traffic sensor of light fixture 1400 may measure the traffic status and transmit data to light fixtures 1300, 1500, 1700, and 1800. Similar to when the vehicle X was in position X', light fixture 1500 may determine to illuminate, due to its being the next light fixture in the direction of travel. However, light fixture 1700 may also determine to illuminate. Although light fixture 1700 is not in the indicated direction of travel between points X' and X", it is possible for vehicle X to alter its direction of travel, turning off street 1600 and onto street 1610. Therefore, due to the possibility of vehicle X traveling to either of positions X''' and X'''', the communication capabilities of the network of light fixtures may cause both light fixtures 1500 and 1700 to illuminate, so as to provide adequate illumination to vehicle X before entering detection fields 1542 and 1742.

Similar to the behavior of light fixture 1500 when vehicle X was in position X', when vehicle X is in position X", light fixture 1800 may be optionally illuminated or not illuminated according to the criteria listed hereinabove.

Referring now to FIG. 15, an embodiment of the invention including a nodal network 1900 of light fixtures is depicted. The nodal network 1900 comprises a plurality of light fixtures 2000, 2010, 2020, 2040, 2050, and 2060. Each of the light fixtures is configured substantially as described above, each including a communication device (not shown). Light fixtures 2000, 2010, and 2020 may be associated to form a first node 2030.

Figure 16:
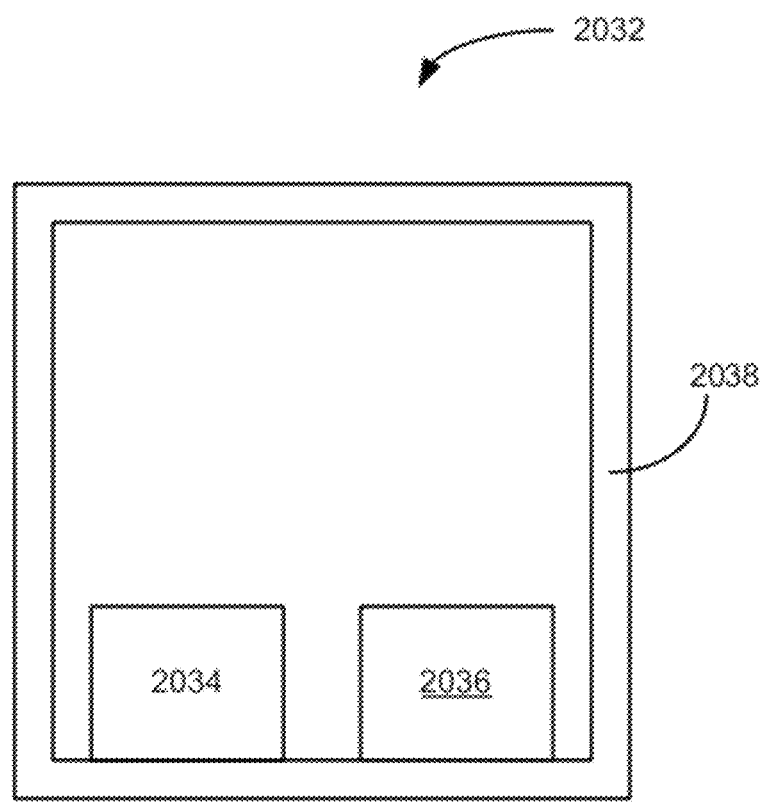
FIG. 16 depicts a sectional view of a node controller according to the embodiment of the invention depicted in FIG. 15.

As shown in FIG. 16, the first node 2030 may be controlled by a node controller 2032, which may include a microcontroller 2034 and a communication device 2036. The node controller 2032 may further include a housing 2038 containing the microcontroller 2034 and the communication device 2036. The housing 2038 may be fixedly attached to one of the light fixtures of the first node 2030, or it may be disposed within the housing of one of the light fixtures of the first node 2030. Furthermore, the node controller 2032 may be configured to electrically couple to a power supply, such as the power supply of a light fixture of the first node 2030, i.e. a solar panel and battery system.

The communication device 2036 may be any type of communication device as described for the communication devices of the light fixtures described hereinabove. The communication device 2036 may be configured to communicate with each of the communication devices of the light fixtures of the first node 2030, thereby forming the first node 2030.

Similarly, light fixtures 2040, 2050, and 2060 may be associated to form a second node 2070. The second node 2070 may be controlled by a second node controller that may include a microcontroller and a communication device, substantially as described for node controller 2032. The communication device of the second node controller may be configured to communicate with each of the communication devices of the light fixtures of the second node 2070, thereby forming the second node 2070.

Referring now to FIGS. 15-16, each light fixture of the first and second nodes 2030, 2070 may function substantially as the light fixtures described hereinabove. However, light fixtures of the first node 2030 do not necessarily communicate directly with light fixtures of the second node 2070. Instead, the light fixtures of the first node 2030 may transmit data to and receive data from the node controller 2032 via the communication device 2034. Similarly, the light fixtures of the first node 2070 may transmit data to and receive data from the second node controller via the communication device of the second node controller. However, communication device 2036 may communicate with communication device of second node controller, thereby functionally associating node controller 2032 with second node controller. In accordance with the network described hereinabove. Each of the node controllers 2032, 2072 may transmit data to and from each other. The data may include, without limitation, traffic status and ambient light intensity. When an object is detected in the detection field of one of the light fixtures of the first node 2030, node controller 2032 may illuminate each of the light fixtures of the first node 2030. Furthermore, node controller 2032 may communicate data regarding the object to the second node controller. If the second node controller determines the data indicates that the object may travel into proximity of the light fixtures of the second node 2070, the second node controller may illuminate the light fixtures of the second node 2070. Moreover, the second node controller may determine to illuminate the light fixtures of the second node 2070 based upon data received from the light fixtures of the second node 2070. Finally, the second node controller may determine to illuminate the light fixtures of the second node 2070 based upon a combination of data received from the light fixtures of the second node 2070 and data received from the first node 2030.

Continuing to refer to FIGS. 15-16, the nodal network 1900 may further include a third node 2110 including light fixtures 2080, 2090, and 2100, whereby the third node 2110 is controlled by a third node controller that may include a microcontroller and a communication device substantially as described for node controller 2032. The third node controller may communicate with either of node controller 2032 and the node controller of the second node 2070, or both, transmitting and receiving data as described hereinabove, forming a mesh network. The third node controller may optionally illuminate the light fixtures of the third node 2110 based upon data received from the light fixtures of the third node 2110, data received from the first node 2030 or the second node 2070 or both, and combinations thereof.

Although a nodal network including three nodes has been disclosed, a skilled artisan will appreciate that a nodal network including any number of nodes is included within the scope of the invention. Moreover, although nodes consisting of three light fixtures have been depicted, nodes consisting of any number of light fixtures are contemplated and included within the scope of the invention. The skilled artisan will further appreciate that the present invention contemplates that individual light fixtures in each of the nodes are capable of communicating with other individual light fixtures in other nodes. For example, and for the sake of efficiency, it is contemplated that a last light fixture in a first node may communicate directly with a first light fixture of an adjacent node depending upon appropriateness and proximity of the light fixtures in the adjacent nodes.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

That which is claimed is:

1. A light fixture comprising:
a light source;
an ambient light sensor;
a traffic sensor having a detection field;
a microcontroller functionally coupled to the light source, the ambient light sensor, and the traffic sensor;
a housing disposed substantially about the light source; and
a support having a first end attached to the housing and a second end attached to a surface; wherein the ambient light sensor is configured to measure an ambient light intensity;
wherein the microcontroller is programmed to determine if the ambient light intensity is approximately equal to or less than a threshold intensity;
wherein the light source is configured to emit light having an intensity proportional to the ambient light intensity;
wherein the traffic sensor is configured to make a measurement related to a target within the detection field;
wherein one of the traffic sensor and the microcontroller is configured to determine a distance of a target within the detection field;
wherein the microcontroller is configured to operate the light source to emit light within a wavelength range corresponding to a scotopic wavelength range when the target is within a first distance range;
wherein the microcontroller is configured to operate the light source to emit light within a wavelength range corresponding to a photopic wavelength range when the target is within a second distance range; and
wherein the second distance range is generally nearer the light fixture than the first distance range.

2. A light fixture according to claim 1, wherein the ambient light sensor comprises a photovoltaic device.

3. A light fixture according to claim 2, further comprising a battery functionally coupled to the photovoltaic device, the light source, and the microcontroller; wherein the photovoltaic device is configured to produce electrical power that is stored by the battery; and wherein the light source and the microcontroller are configured to be operated using electrical power drawn from the battery.

4. A light fixture according to claim 1, wherein the ambient light sensor has an operative surface; and wherein the operative surface is oriented generally upwards.

5. A light fixture according to claim 1, wherein the light source comprises a first light emitting element and a second light emitting element; wherein the first light emitting element is configured to emit light having a wavelength range that corresponds to a substantially scotopic wavelength range; and wherein the second light emitting element is configured to emit light having a wavelength range that corresponds to a substantially photopic wavelength range.

6. A light fixture according to claim 5, wherein the first light emitting element emits light having a wavelength range of between about 560 nanometers and 610 nanometers.

7. A light fixture according to claim 5, wherein the second light emitting element emits light having a wavelength range of between about 500 nanometers and about 550 nanometers or a wavelength range of between about 610 nanometers and about 660 nanometers.

8. A light fixture according to claim 5, wherein each of the first light emitting element and second light emitting element comprise a cluster of light emitting diodes (LEDs).

9. A light fixture according to claim 1, wherein the light source is configured to emit light having a first intensity and a second intensity.

10. A light fixture according to claim 1, wherein the traffic sensor is a sensor selected from the group of sensors consisting of optical sensors and acoustic sensors.

11. A light fixture according to claim 1 wherein the detection field is directed generally toward a street.

12. A light fixture according to claim 1, wherein the traffic sensor is configured to measure a traffic status.

13. A light fixture according to claim 12, wherein the traffic status is at least one of traffic volume, traffic direction, and traffic speed.

14. A light fixture according to claim 1, wherein the light fixture further comprises a communication device.

15. A light fixture according to claim 14, wherein the communication device is a wireless communication device.

16. A light fixture according to claim 14, wherein the communication device is a communication device selected from the group of communication devices consisting of radio devices, computer network devices, visible light devices, and acoustic devices.

17. A light fixture according to claim 14, wherein the communication device is configured to functionally associate with a traffic network.

18. A light fixture according to claim 17, wherein the traffic network comprises a traffic count system.

19. A light fixture comprising:
a light source comprising a first light emitting element and a second light emitting element, the first light emitting element being configured to emit light having a first wavelength range that corresponds to a substantially scotopic wavelength range and the second light emitting element being configured to emit light having a second wavelength range that corresponds to a substantially photopic wavelength range;
an ambient light sensor comprising a photovoltaic device;
a traffic sensor having a detection field directed generally toward a street;
a communication device
a microcontroller functionally coupled to the light source, the ambient light sensor, the traffic sensor, and the communication device;
a housing disposed substantially about the light source; and
a support having a first end attached to the housing and a second end attached to a surface;
wherein the ambient light sensor is configured to measure an ambient light intensity;

wherein the microcontroller includes software configured to determine if the ambient light intensity is approximately equal to or less than a threshold intensity;
wherein the light source is configured to emit light having an intensity proportional to the ambient light intensity;
wherein the light source is configured to emit light having a first intensity and a second intensity;
wherein each of the first light emitting element and second light emitting element comprise a cluster of light emitting diodes (LEDs);
wherein the traffic sensor is selected from the group of traffic sensors consisting of optical sensor and acoustic sensor;
wherein the traffic sensor is configured to measure a traffic status including at least one of traffic volume, traffic direction, and traffic speed;
wherein the traffic sensor is configured to make a measurement related to a target within the detection field;
wherein one of the traffic sensor and the microcontroller is configured to determine a distance based on the measurement of the traffic sensor;
wherein the microcontroller is configured to operate the light source to emit light within the first wavelength range when the target is within a first distance range;
wherein the microcontroller is configured to operate the light source to emit light within the second wavelength range when the target is within a second distance range;
wherein the second distance range is generally nearer the light fixture than the first distance range; and
wherein the communication device is a communication device selected from the group of communication devices consisting of radio devices, computer network devices, visible light devices, and acoustic devices.

20. A light fixture according to claim 19, wherein the first wavelength range is between about 560 nanometers and 610 nanometers; and wherein the second wavelength range is either between about 500 nanometers and about 550 nanometers or about 610 nanometers and about 660 nanometers.

21. A light fixture according to claim 19, wherein the communication device is configured to functionally associate with a traffic network.

22. A light fixture according to claim 19, wherein the traffic network comprises a traffic count system.

23. A light fixture according to claim 19, wherein the ambient light sensor has an operative surface; and
wherein the operative surface is oriented generally upwards.

24. A network of light fixtures comprising:
a plurality of light fixtures comprising;
a light source;
an ambient light sensor;
a communication device;
a traffic sensor having a detection field;
a microcontroller functionally coupled to the light source, the ambient light sensor, the communication device, and the traffic sensor;
a housing disposed substantially about the light source; and
a support structure having a first end attached to the housing and a second end attached to a surface;
wherein the ambient light sensor is configured to measure an ambient light intensity; wherein the microcontroller is programmed to determine if the ambient light intensity is approximately equal to or less than a threshold intensity; and wherein the light is configured to emit light having an intensity proportional to the ambient light intensity;
wherein the traffic sensor is configured to make a measurement related to a target within the detection field;
wherein one of the traffic sensor and the microcontroller is configured to determine a distance based on the measurement of the traffic sensor;
wherein the microcontroller is configured to operate the light source to emit light within a wavelength range corresponding to a scotopic wavelength range when the target is within a first distance range;
wherein the microcontroller is configured to operate the light source to emit light within a wavelength range corresponding to a photopic wavelength range when the target is within a second distance range; and
wherein the second distance range is generally nearer the light fixture than the first distance range; and
wherein the communication device of each of the plurality of light fixtures are configured to transmit data.

25. A network of light fixtures according to claim 24, wherein the communication devices of a first group of light fixtures are configured to exchange data with each other, forming a first node; wherein the communication devices of a second group of light fixtures are configured to exchange data with each other, forming a second node; wherein the first node comprises a first node controller and the second node comprises a second node controller; and wherein the first node controller is configured to exchange data with the second node controller.

26. A network of light fixtures according to claim 25, wherein the communication devices of a third group of light fixtures are configured to exchange data with each other, forming a third node; wherein the third node comprises a third node controller configured to exchange data with the second node controller; and wherein data from the first node controller is exchanged with data from the third node controller via the second node controller, thereby forming a mesh network.

27. A network of light fixtures according to claim 24, wherein the communication device of each of the plurality of light fixtures are configured to transmit data received from another light fixture thereby forming a mesh network.

28. A network of light fixtures according to claim 24, wherein each of the traffic sensors is selected from the group of traffic sensors including optical sensors and acoustic sensors.

29. A network of light fixtures according to claim 24, wherein each of the traffic sensors is configured to measure a traffic status, the traffic status including at least one of traffic volume, traffic direction, and traffic speed.

30. A network of light fixtures according to claim 29, wherein the data includes at least one of ambient light measurement and traffic status.

31. A network of light fixtures according to claim 24, wherein the light source of each of a first and second light fixtures includes a first light emitting element and a second light emitting element.

32. A network of light fixtures according to claim 31, wherein the first light emitting element emits a light having a wavelength range corresponding to a substantially scotopic wavelength range; and wherein the second light emitting element emits a light having a wavelength range corresponding to a substantially photopic wavelength range.

33. A method of operating a light fixture that includes a light source, an ambient light sensor, and a traffic sensor having a detection field, comprising the steps of:
receiving an ambient light measurement from the ambient light sensor;
determining if the ambient light measurement is at or below a threshold measurement;

determining a distance of a target within the detection field;
determining if the target is within one of a first distance range and a second distance range; and
energizing the light source to emit a light responsive to both the ambient light measurement and the distance of the target;
wherein the light source is energized to emit a light having an intensity that is proportional to the ambient light measurement;
wherein the determination that the target is within the first distance range results in the step of energizing the light source to emit light within a wavelength range corresponding to a scotopic wavelength range; and
wherein the determination that the target is within the second distance range results in the step of energizing the light source to emit light within a wavelength range corresponding to a photopic wavelength range; and
wherein the second distance range is generally nearer the light fixture than the first distance range.

34. A method according to claim 33, wherein the light source emits light having a first intensity; wherein the light source emits light having an intensity greater than the first intensity when the ambient light measurement indicates an ambient light within a first range defined as a first range intensity; and wherein the light source emits light having an intensity less than the first intensity when the ambient light measurement indicates an ambient light within a second range defined as a second range intensity.

35. A method according to claim 34 wherein the first range is of a greater intensity than the second range.

36. A method according to claim 35 wherein the first range intensity corresponds to a maximum light output state; and wherein the second range intensity corresponds to a minimum light output state.

37. A method according to claim 33 wherein the light source comprises at least one plurality of light emitting diodes (LEDs) that emit light having a wavelength range.

38. A method according to claim 37 wherein the at least one plurality of LEDs comprises a first plurality of LEDs that emit light having a wavelength range corresponding to a substantially scotopic wavelength range and a second plurality of LEDs that emit light having a wavelength range corresponding to a substantially photopic wavelength range.

39. A method according to claim 33 wherein the ambient light sensor comprises a photovoltaic device.

40. A method according to claim 39, further comprising the step of providing power to the light fixture by the photovoltaic device.

41. A method according to claim 33 wherein the light fixture further comprises a traffic sensor; wherein the method further comprises the steps of receiving a measurement from the traffic sensor indicating a traffic status; wherein the light source is energized to emit a light having an intensity that is proportional to at least one of the ambient light measurement and the traffic status.

42. A method according to claim 41 wherein the traffic sensor is selected from the group of sensors consisting of optical sensors and acoustic sensors.

43. A method according to claim 41, wherein the traffic status includes at least one of traffic volume, traffic direction, traffic speed, and traffic distance.

44. A method of operating a light fixture including a light source, a traffic sensor having a detection field, and an ambient light sensor, the method comprising the steps of:
receiving an ambient light measurement from the ambient light sensor;
determining if the light measurement reaches a threshold measurement;
receiving a measurement from the traffic sensor indicating a traffic status, the traffic status including the distance of a target within the detection field; and
energizing the light source to emit a light that is responsive to at least one of the traffic status and the ambient light measurement;
wherein the light source is energized to a first state causing the light source to emit light having a wavelength range corresponding to a substantially scotopic wavelength range when the traffic status is within a first status range;
and wherein the light source is energized to a second state causing the light source to emit light having a wavelength range corresponding to a substantially photopic wavelength range when the traffic status is within a second status range.

45. A method according to claim 44, wherein the traffic status further comprises at least one of traffic volume, traffic direction, and traffic speed.

46. A method according to claim 44, wherein the traffic sensor is a sensor selected from the group of sensors consisting of optical sensors and acoustic sensors.

47. A method according to claim 44, wherein the light fixture further includes a communication device, further comprising the steps of:
connecting the light fixture to a traffic network;
receiving data from the traffic network; and
energizing the light source to emit a light that is proportional to at least one of the traffic status, the ambient light measurement, and the data.

48. A method according to claim 47, wherein the data is associated with at least one of traffic volume, traffic direction, traffic speed, and traffic distance.

49. A method according to claim 47, wherein the traffic network comprises a traffic count system.

50. A method of operating a network of light fixtures including at least a first light fixture and a second light fixture, each light fixture including a light source, an ambient light sensor, a traffic sensor having a detection field, and a communication device, the method comprising the steps of:
receiving an ambient light measurement from the ambient light sensor of the first light fixture;
determining if the light measurement reaches a threshold measurement;
receiving a measurement from the traffic sensor of the first light fixture indicating a first traffic status including a distance of a target within the detection field;
energizing the light source of the first light fixture to a state to emit a light that is proportional to at least one of the first traffic status and the ambient light measurement;
transmitting data from the first light fixture to the second light fixture;
receiving a measurement from the traffic sensor of the second light fixture indicating a second traffic status;
determining a first estimated status by interpreting a combination of the data and the second traffic status including a distance of the target from the second light fixture; and
energizing the light source of the second light fixture to a state to emit a light that is proportional to at least one of the second traffic status, the first estimated status, and the ambient light measurement;
wherein the light source of each of the first light fixture and the second light fixture is energized to emit light within a wavelength range corresponding to a scotopic wavelength range when the target is within a first distance range;

wherein the light source of each of the first light fixture and the second light fixture is energized to emit light within a wavelength range corresponding to a photopic wavelength range when the target is within a second distance range; and wherein the second distance range is generally nearer the respective light fixture than the first distance range.

51. A method according to claim 50, wherein the light source of the first light fixture is energized to a first state when the first traffic status is within a first status range and energized to a second state when the first traffic status is within a second status range; and wherein the light source of the second light fixture is energized to a third state when at least one of the second traffic status and the first estimated status is within a third status range, and energized to a fourth state when at least one of the traffic status and the first estimated status is within a fourth status range.

52. A method according to claim 51, wherein each of the first state and the third state causes the light source to emit light having a wavelength range corresponding to a substantially scotopic wavelength range; and wherein each of the second state and fourth state causes the light source to emit light having a wavelength range corresponding to a substantially photopic wavelength range.

53. A method according to claim 50, wherein each of the first traffic status, second traffic status, first estimated status, and data is associated with at least one of traffic volume, traffic direction, traffic speed, and traffic distance.

54. A method according to claim 50, wherein the communication device operates using a wireless device.

55. A method according to claim 50, wherein the communication device operates using a communication method selected from the group of communication methods consisting of radio frequency, computer network, visible light communication, and acoustic communication.

56. A method according to claim 50, wherein the traffic sensor of each of the first light fixture and the second light fixture is a sensor selected from the group of sensors consisting of optical sensors and acoustic sensors.

57. A method according to claim 50, further comprising the steps of:
receiving a second measurement from the traffic sensor of the first lighting fixture indicating a fourth traffic status;
energizing the light source of the first light fixture to a second state to emit a light proportional to at least one of the fourth traffic status and the ambient light measurement;
receiving a second measurement from the traffic sensor of the second light fixture indicating a fourth traffic status;
determining a second estimated status by interpreting a combination of the third traffic status and the data; and
energizing the light source of the second light fixture to a fourth state to emit a light proportional to at least one of the fourth traffic status, the second estimated status, and the ambient light measurement.

58. A method according to claim 57, wherein each of the first traffic status, second traffic status, third traffic status, fourth traffic status, first estimated status, second estimated status, and data is associated with at least one of traffic volume, traffic direction, traffic speed, and traffic distance.

59. A method according to claim 58, wherein the data is associated with at least one of the first measurement of the traffic sensor of the first lighting fixture and the second measurement of the traffic sensor of the first lighting fixture.

60. A method according to claim 58, wherein each of the first state and the third state causes the light source to emit light having a wavelength range corresponding to a substantially scotopic wavelength range; and wherein each of the second state and the fourth causes the light source to emit light having a wavelength range corresponding to a substantially photopic wavelength range.

61. A method of operating a light fixture having a light source and a traffic sensor, the method comprising the steps of:
receiving a first target measurement from the traffic sensor;
determining an approximate first distance from the first target measurement;
energizing the light source to a first condition causing the light source to emit light having a wavelength range corresponding to a substantially scotopic wavelength range;
receiving a second target measurement from the traffic sensor;
determining an approximate second distance from the second target measurement; and
energizing the light source to a second condition causing the light source to emit light having a wavelength range corresponding to a substantially photopic wavelength range
wherein the second distance is generally nearer the light fixture than the first distance.

62. A method according to claim 61, wherein the first distance is greater than the second distance.

63. A method according to claim 61, further comprising the steps of:
receiving a third target measurement from the traffic sensor;
determining an approximate third distance from the third target measurement; and
energizing the light source to a third condition.

64. A method according to claim 63 wherein the third condition causes the light source to emit a light having a wavelength range corresponding to a substantially scotopic wavelength.

65. A method according to claim 63, wherein the first distance is greater than the second distance; and wherein the third distance is greater than the second distance.

66. A method according to claim 61, further comprising the steps of:
receiving from the traffic sensor a plurality of measurements of a moving target;
determining for each measurement of the plurality of measurements an approximate distance corresponding to an approximate distance of the moving target at the time the measurement was received;
determining an energizing condition corresponding to each of the determined approximate distances, the energizing conditions forming a plurality of energizing conditions and a sequential order of energization; and
energizing the light source to energizing conditions corresponding to the sequential order of energization.

67. A method according to claim 66, wherein at least one of the plurality of energizing conditions causes the light source to emit light in a wavelength range corresponding to a substantially scotopic wavelength range; and wherein at least one of the plurality of energizing conditions causes the light source to emit light in a wavelength range corresponding to a substantially photopic wavelength range.

68. A method according to claim 66, wherein the sequential order of energization causes the light source to emit light having a progression of wavelength ranges.

69. A method according to claim 66, wherein the progression of wavelength ranges includes a progression from wavelength ranges corresponding to substantially scotopic wavelength ranges to wavelength ranges corresponding to substantially photopic wavelength ranges.

70. A method according to claim 66, wherein the progression of wavelength ranges includes a progression from wavelength ranges corresponding to substantially photopic wavelength ranges to wavelength ranges corresponding to substantially scotopic wavelength ranges.

71. A method according to claim 44, wherein the first state is a minimum light output; and wherein the second state is a maximum light output.

* * * * *